United States Patent [19]

Hsia

[11] Patent Number: 5,586,548
[45] Date of Patent: Dec. 24, 1996

[54] FLOATING SOLAR HEATER FOR POOL WATER

[76] Inventor: Chih-Yu Hsia, 301 Warren Wy., Arcadia, Calif. 91006

[21] Appl. No.: 395,715

[22] Filed: Feb. 28, 1995

[51] Int. Cl.$^6$ ............................................. F24J 2/42
[52] U.S. Cl. ..................... 126/565; 126/568; 165/287
[58] Field of Search ......................... 126/565, 566, 126/568, 561; 165/32 HV

[56] References Cited

U.S. PATENT DOCUMENTS

| | | | |
|---|---|---|---|
| 3,463,224 | 8/1969 | Myers | 165/32 HV |
| 3,893,443 | 7/1975 | Smith . | |
| 3,998,204 | 12/1976 | Fuchs et al. | 126/565 |
| 4,022,187 | 5/1977 | Roberts . | |
| 4,108,156 | 8/1978 | Sitter | 126/561 X |
| 4,195,622 | 4/1980 | Dolza et al. . | |
| 4,222,366 | 9/1980 | Acker . | |
| 4,237,860 | 12/1980 | Caroon . | |
| 4,256,087 | 3/1981 | Sowers . | |
| 4,284,060 | 8/1981 | McCluskey . | |
| 4,291,672 | 9/1981 | Ricks | 126/565 |
| 4,303,057 | 12/1981 | Crandon et al. . | |
| 4,312,323 | 1/1982 | Domenech . | |
| 5,143,051 | 9/1992 | Bennett | 126/561 |
| 5,143,052 | 9/1992 | Case . | |

FOREIGN PATENT DOCUMENTS

| | | | |
|---|---|---|---|
| 7161446 | 10/1982 | Japan | 126/568 |
| 0568831 | 8/1977 | U.S.S.R. | 165/32 HV |

Primary Examiner—Carl D. Price
Attorney, Agent, or Firm—William W. Haefliger

[57] ABSTRACT

A floating solar pool heater unit including a solar energy collector plate on the top, a float foam in the middle, and one directional or two directional heat conducting elements. The float foam maintains the flotation of the heater unit. The two directional heat conducting elements including energy conducting rivets, energy dispersing plates, or energy dispersing chains conduct hat from the solar energy collector plate to the pool water, or vice versa. The uni-directional heat conducting variation includes uni-direction heat conductors, energy dispersing plates, energy dispersing members such as chains, and conducts heat from solar energy collector plate or plates to pool water but prevents heat from escaping from pool water by reverse flow. The units can be used individually, or jointly to form a pool cover.

4 Claims, 32 Drawing Sheets

FLOATING SOLAR HEATER FOR POOL WATER

BACKGROUND OF THE INVENTION

This invention relates to solar heaters of the floating passive type for use in heating pool water. This invention also relates to one or uni-directional heat conduction which can be used in floating passive type pool heaters.

Due to its large volume, water in a swimming pool requires considerable energy, for pool heating and comfortable use. Such energy obtained from burning fuel or electricity is expensive. There is need for efficient, low cost pool water heating methods and means.

BRIEF DESCRIPTION OF THE PRIOR ART

In the past, attempts have been made to use solar energy as an expedient for maintaining pool water at a comfortable swimming temperature. One example of such expedients employs pipe coils or tubing exposed to solar radiation and connected to the pool circulating water supply. Such a system requires power to pump pool water through the pipes and then back into the pool. In other instances, solar energy is used on floating units, examples of such devices being disclosed in U.S. Pat. Nos. 3,893,443; 4,022,187; 4,222,366; and 4,284,060.

U.S. Pat. No. 3,893,443 to Smith, discloses a floating solar pool heater of pan type with a top cover and a flat dish or pan attached thereto. Interior surfaces are painted black to absorb the sun's rays and transfer heat to the water. The Smith structure relies on a flat dish or pan in order to float.

U.S. Pat. No. 4,022,187 to Roberts, discloses a floating solar heater for swimming pools, which covers the entire surface of the pool, and which includes a plurality of air filled units each including a top and bottom panel of plastic material with the top panel transparent and the bottom sheet being opaque, the bottom sheet being carried by a rigid frame. The air filled units keep the Roberts structure afloat.

U.S. Pat. No. 4,222,366 to Acker, discloses a solar pool heater comprising a submersible perforated tubular ring, attached to the perimeter of a transparent or translucent sheet which captures an air bubble keeping the heater afloat.

U.S. Pat. No. 4,284,060 to McCluskey, discloses a floating solar heater having a top cover, a vertical outer side wall with inclined inner side wall segments connected thereto, an outside rim and a bottom wall. The flotation of the McCluskey structure is maintained by the head air space enclosed by the top cover, the inner side wall and the bottom wall.

All of the above patents require air spaces to float. There is need for a device which does not need to use air spaces to float.

SUMMARY OF THE INVENTION

The invention introduces an efficient and economical method and means to use solar energy to heat a pool of water. The invention also introduces a technique to keep the heat in the pool. Basically, the invention employs a floating solar pool heat unit which can be individually or jointly used to heat a pool and/or to provide a cover for the pool. The invention also introduces a technique to conduct heat uni-directionally.

Basically, the invention employs, in combination, a) a float having an upper side and a lower side, b) a solar heat collecting first plate at the upper side of the float, c) heat radiating means at the lower side of the float, to contact pool water, and d) heat transfer means extending through the float and between the heat collecting plate and the heat radiating means, for transferring heat by conduction from the plate to the heat radiating means, to enable collected solar heat transfer to the pool water.

As will be seen, the heat radiating means may comprise a second plate extending proximate the lower side of the float; and the plates may be metallic.

Another object is to provide the heat transfer means in the form of a metallic element, the float having a through opening passing said metallic element. The heat radiating means may comprise a second plate extending proximate the lower side of the float, such plates are typically metallic, and the metallic element holds the plates in attached relation to the float. The heat transfer means may comprise a plurality of metallic elements, which are spaced apart, and the float has a plurality of through openings passing the metallic elements. Such elements may have metallic heads extending above the level of the first plate upper surface, the elements interconnecting said plates.

A further object is to provide a float body extending generally horizontally and consisting of synthetic resin foam, with openings extending generally vertically through said body, the first plate having an upper surface exposed upwardly to receive impingement of solar rays.

Yet another object is to provide heat radiating means such as a chain, or other metallic members that extend or extends downwardly below the float for contact with pool water at a depth therein.

A further object is to provide heat transfer means that includes parts that are interengageable in response to heating for downward heat transfer, and disengageable in response to cessation of heating for downward heat transfer. A bi-metallic part may be associated with one of such parts to cause the one part to deflect toward another part, for effecting downward heat transfer, and in response to heating of the bi-metallic element, and to cause the one part to deflect away from the other part, for blocking upward heat transfer via such parts, in response to cessation of heating.

These and other objects and advantages of the invention, as well as the details of an illustrative embodiment, will be more fully understood from the following specification and drawings, in which:

DRAWING DESCRIPTION

The invention is illustrated by reference to the accompanying drawings, in which.

Figure 9:
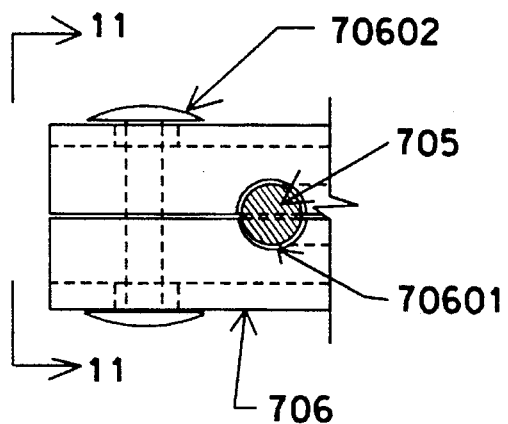
Figure 11:
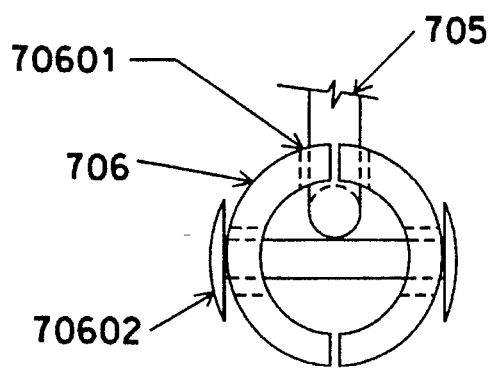
Figure 10:
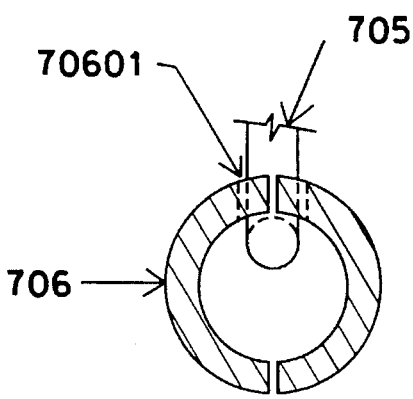
Figure 12:
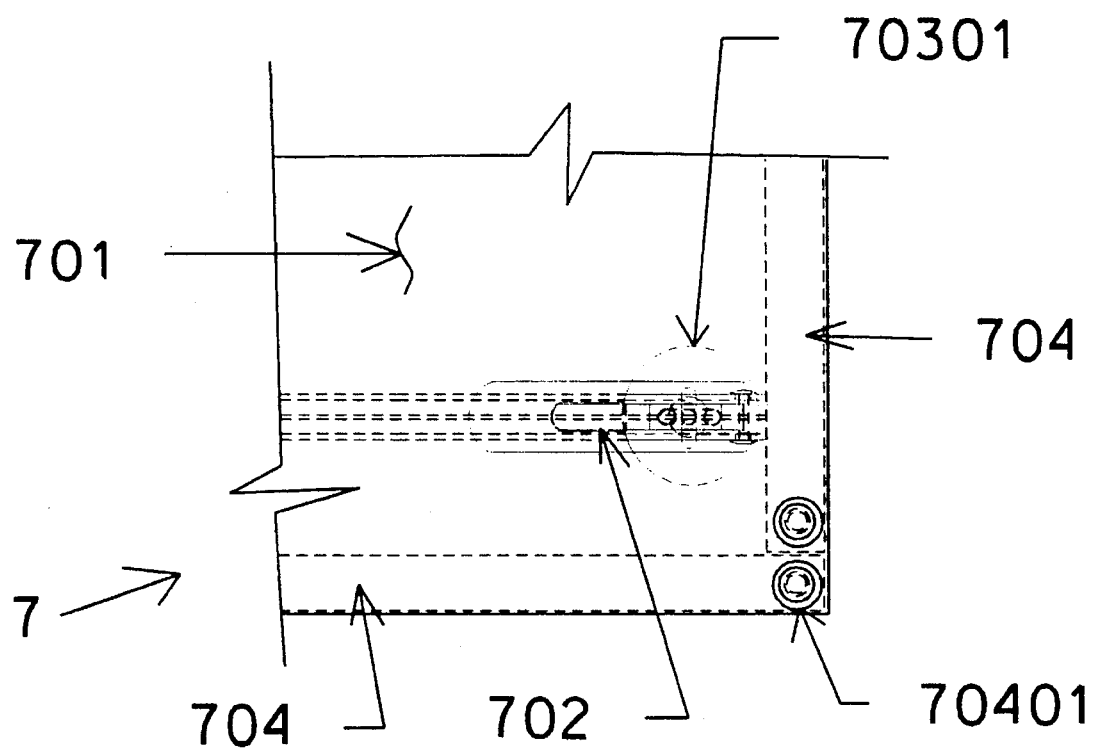
Figure 13:
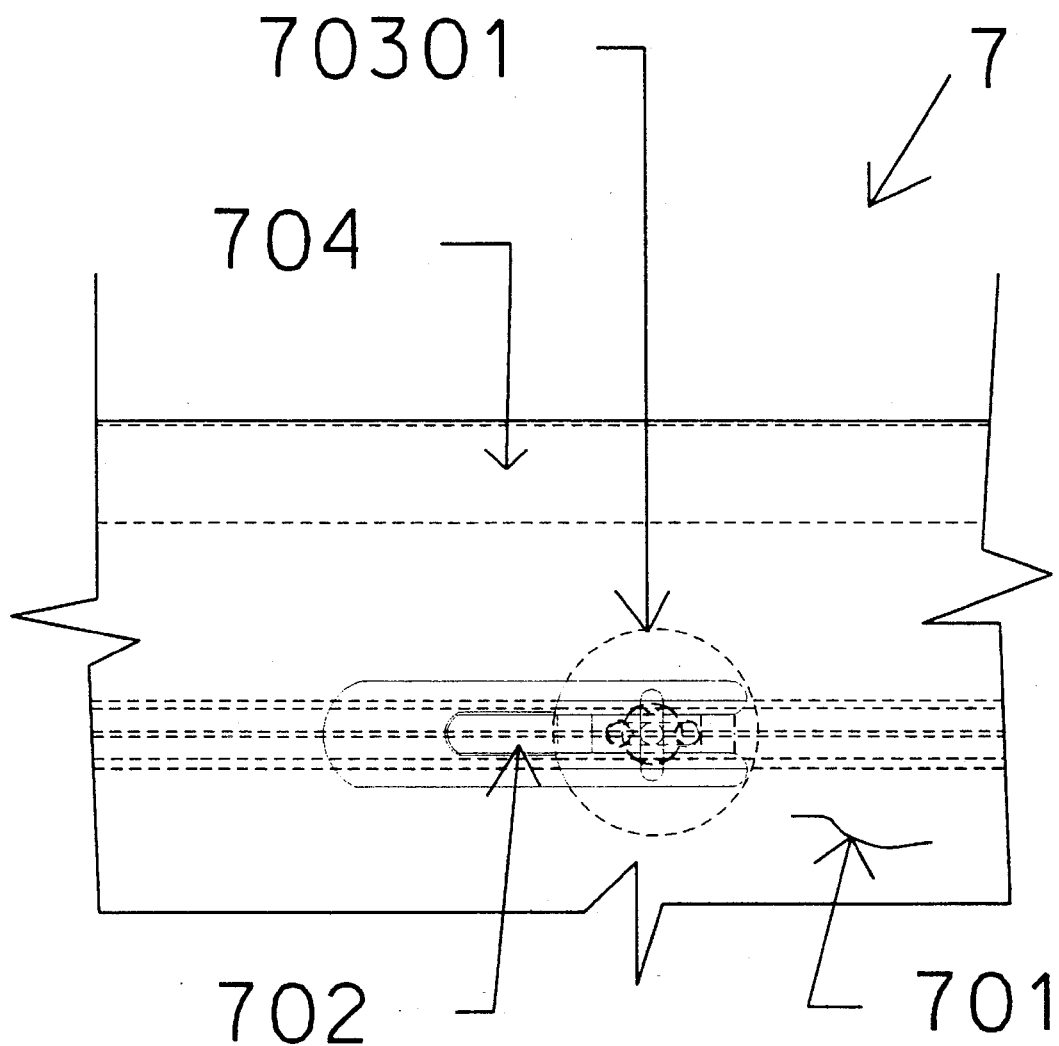
Figure 14:
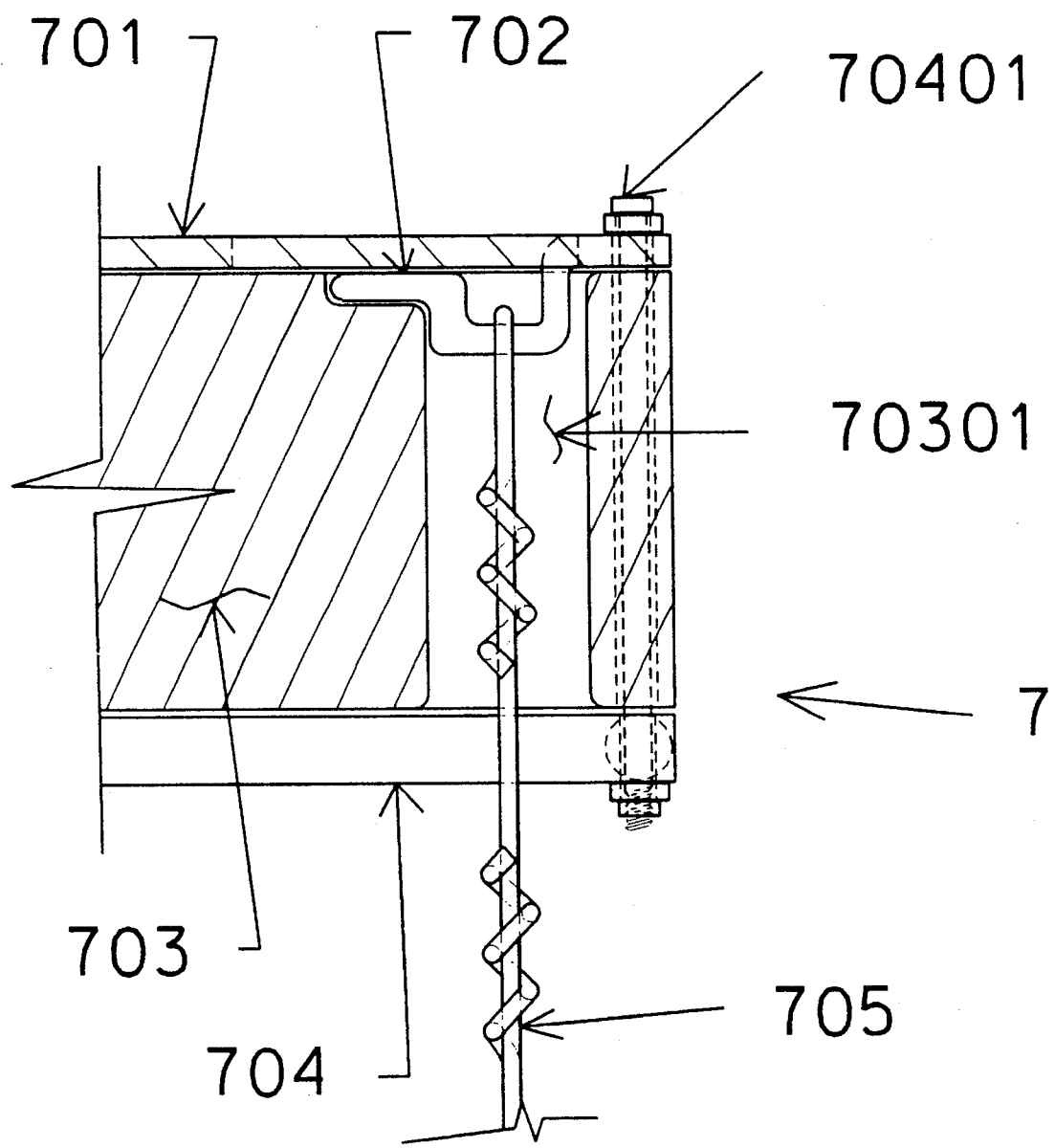
Figure 15:
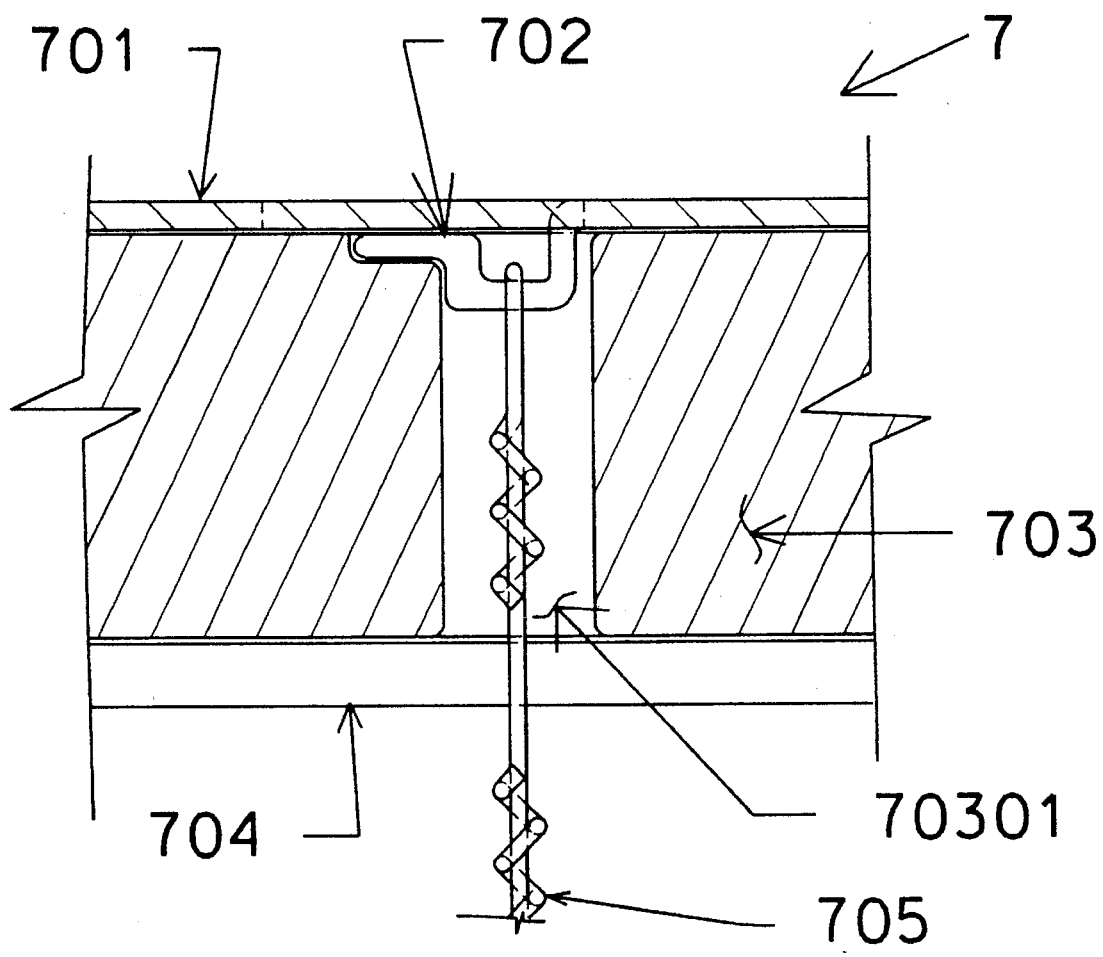
Figure 17:
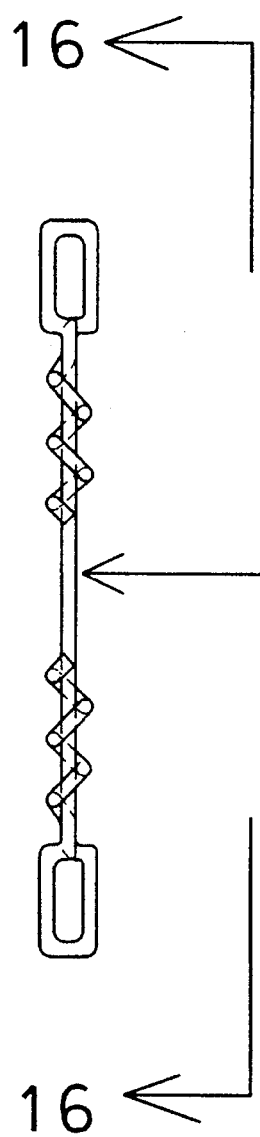
Figure 16:
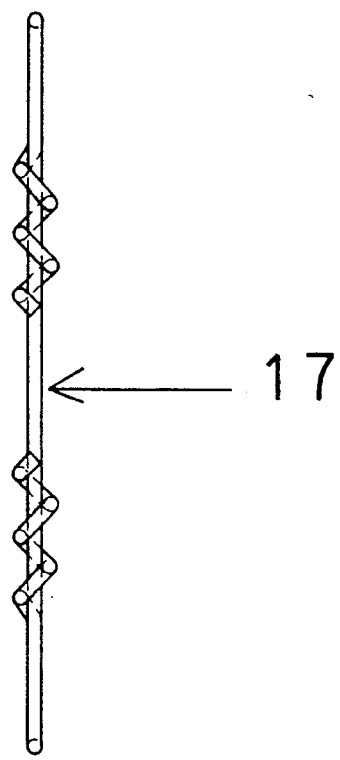
Figure 18:
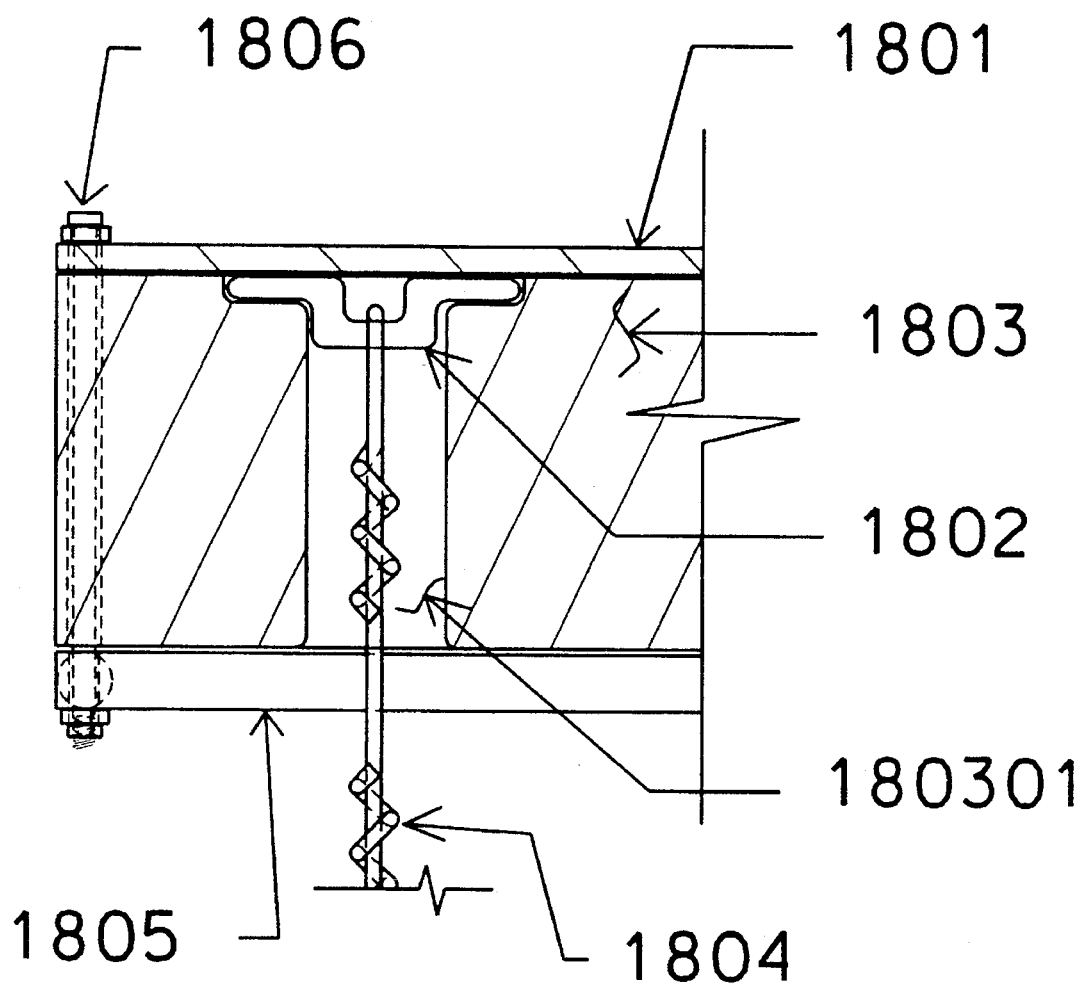
Figure 19:
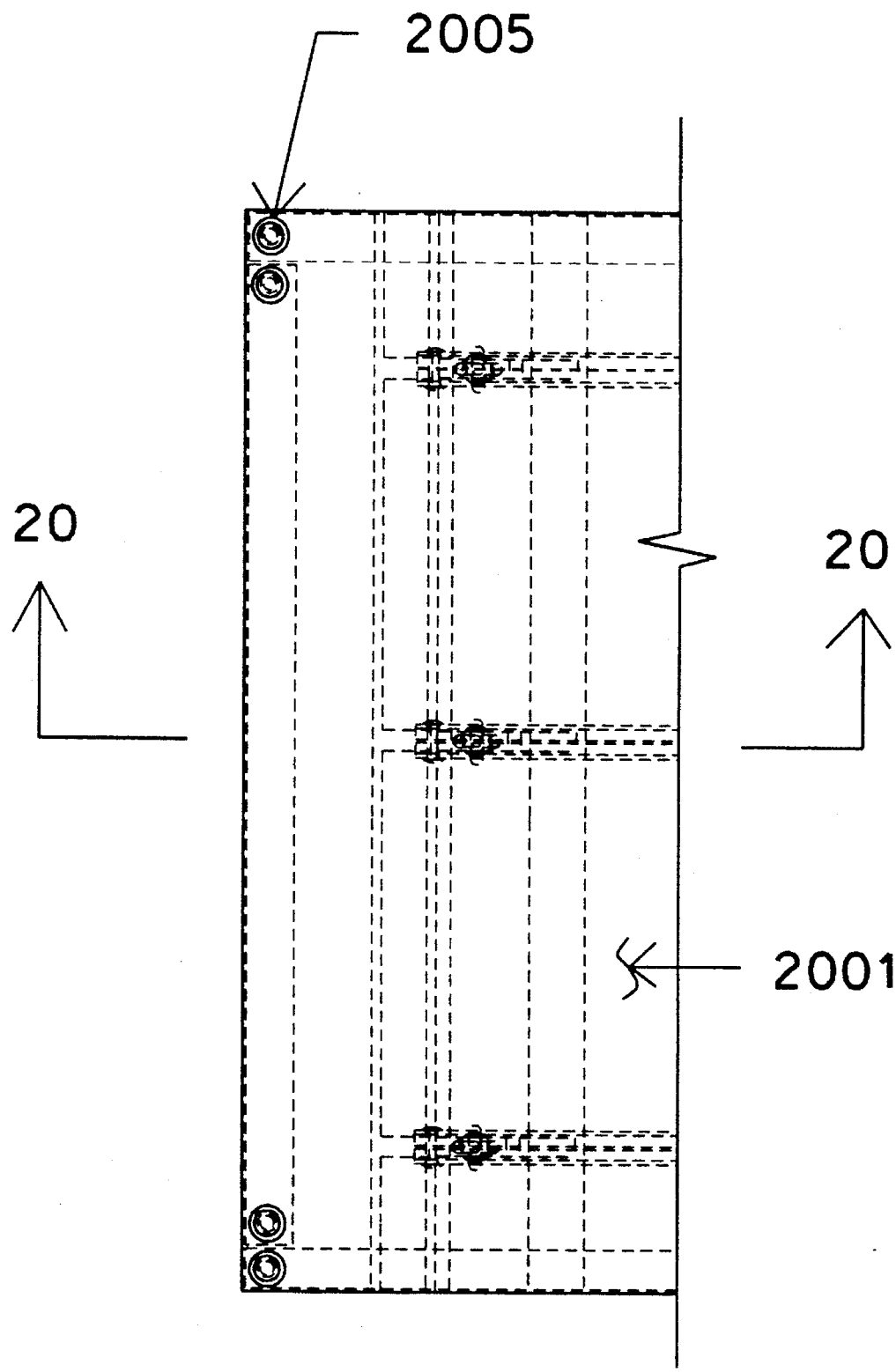
Figure 20:
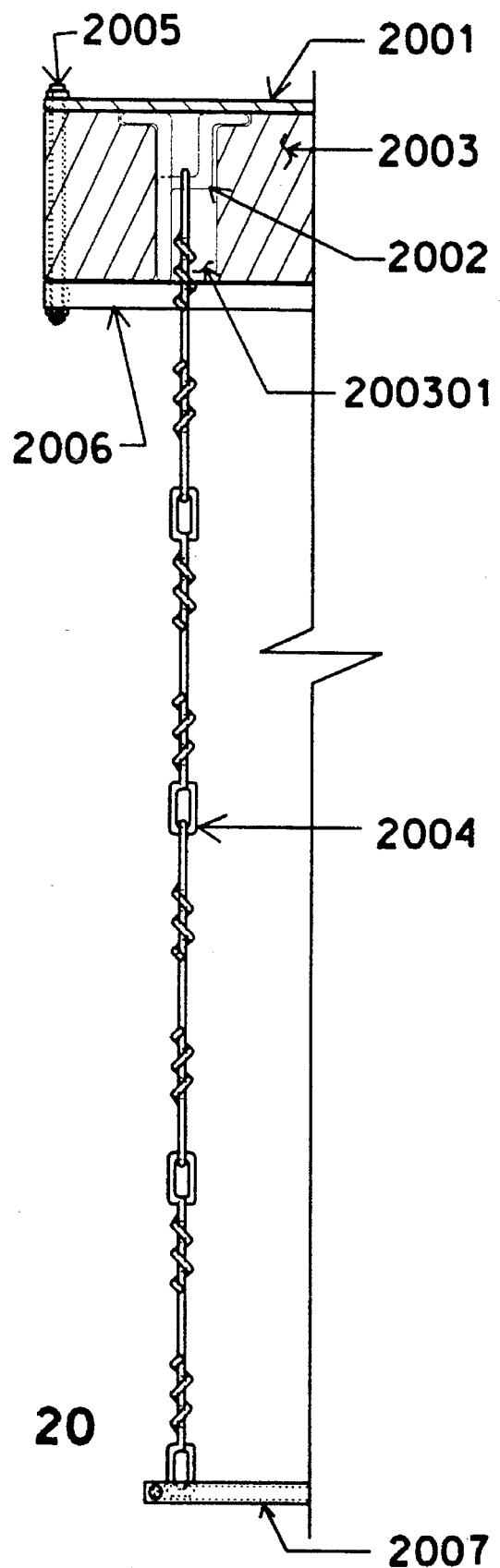
Figure 21:
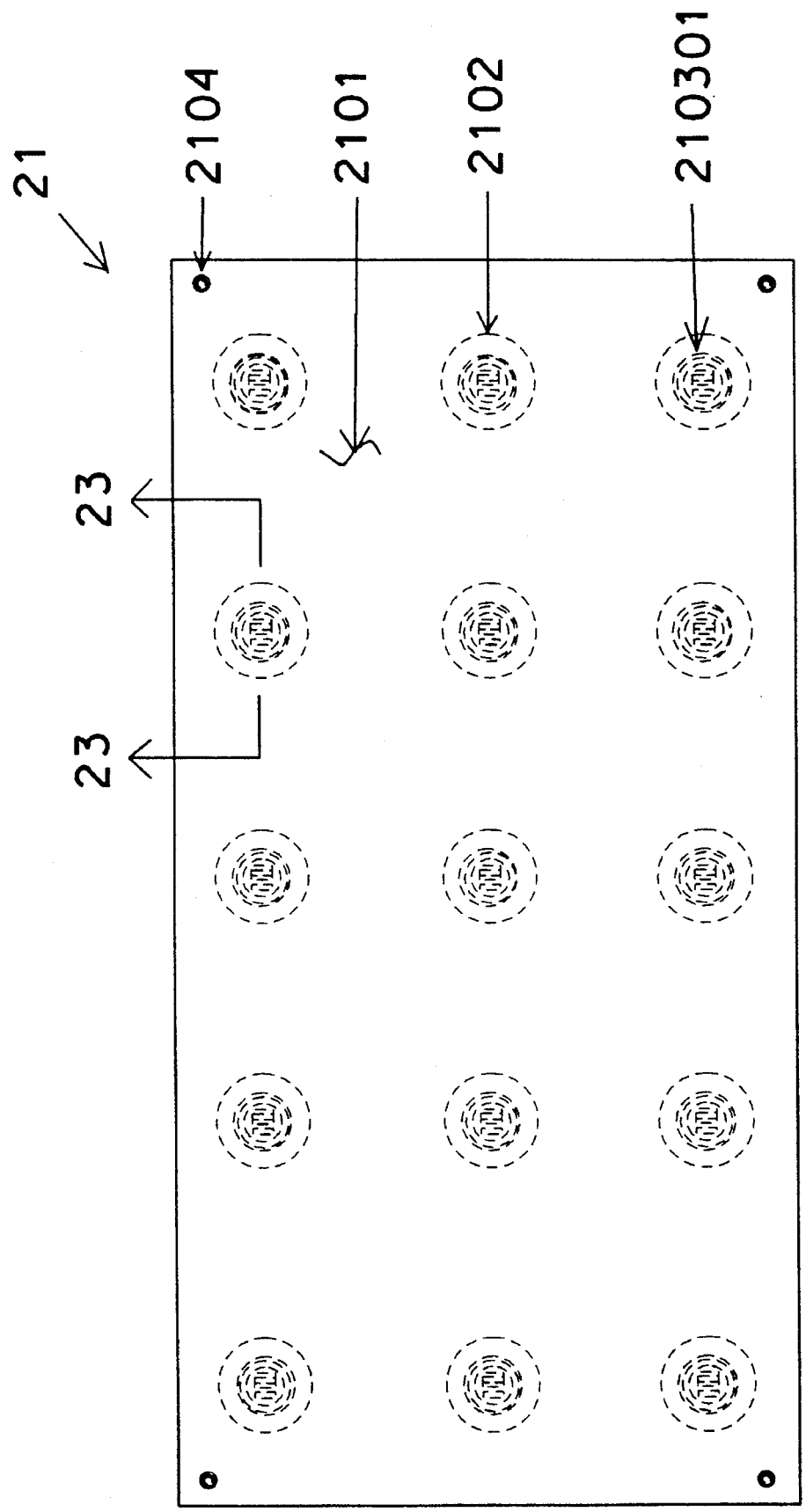
Figure 22:
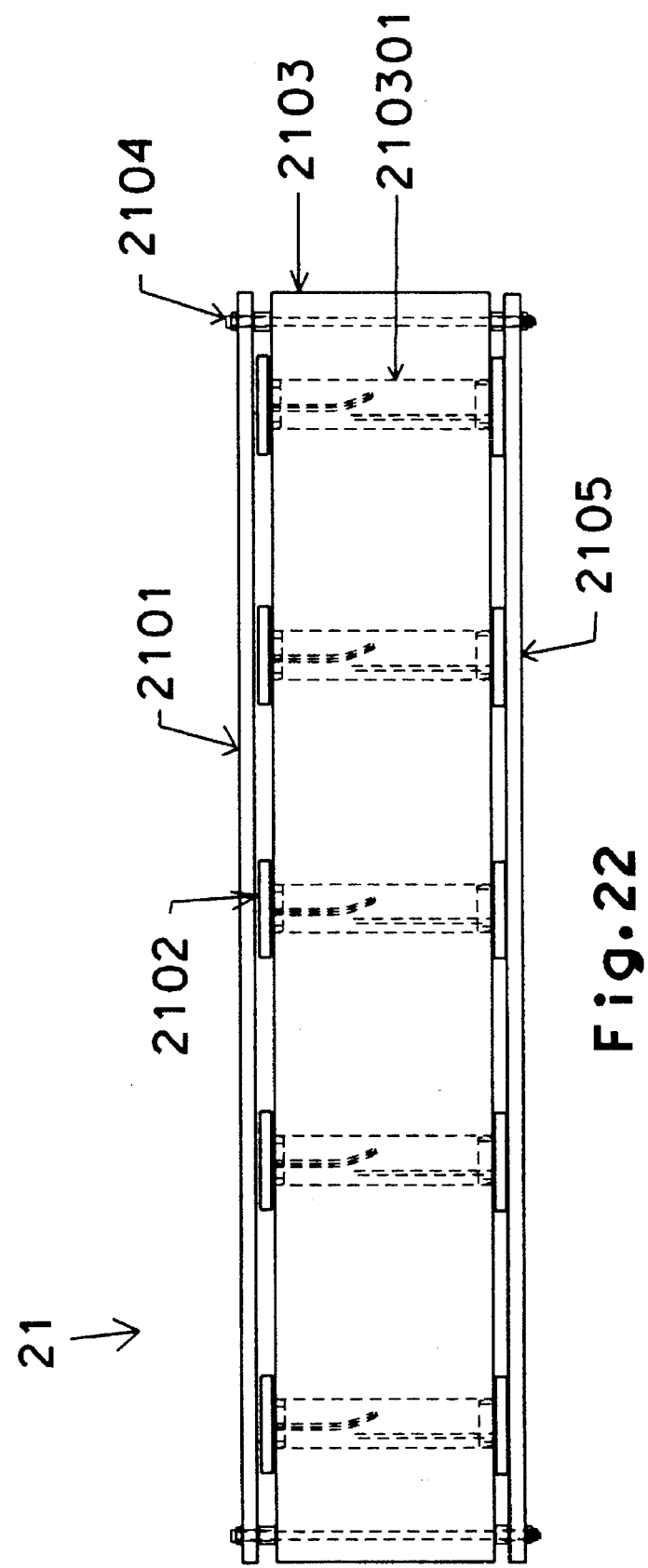
Figure 23:
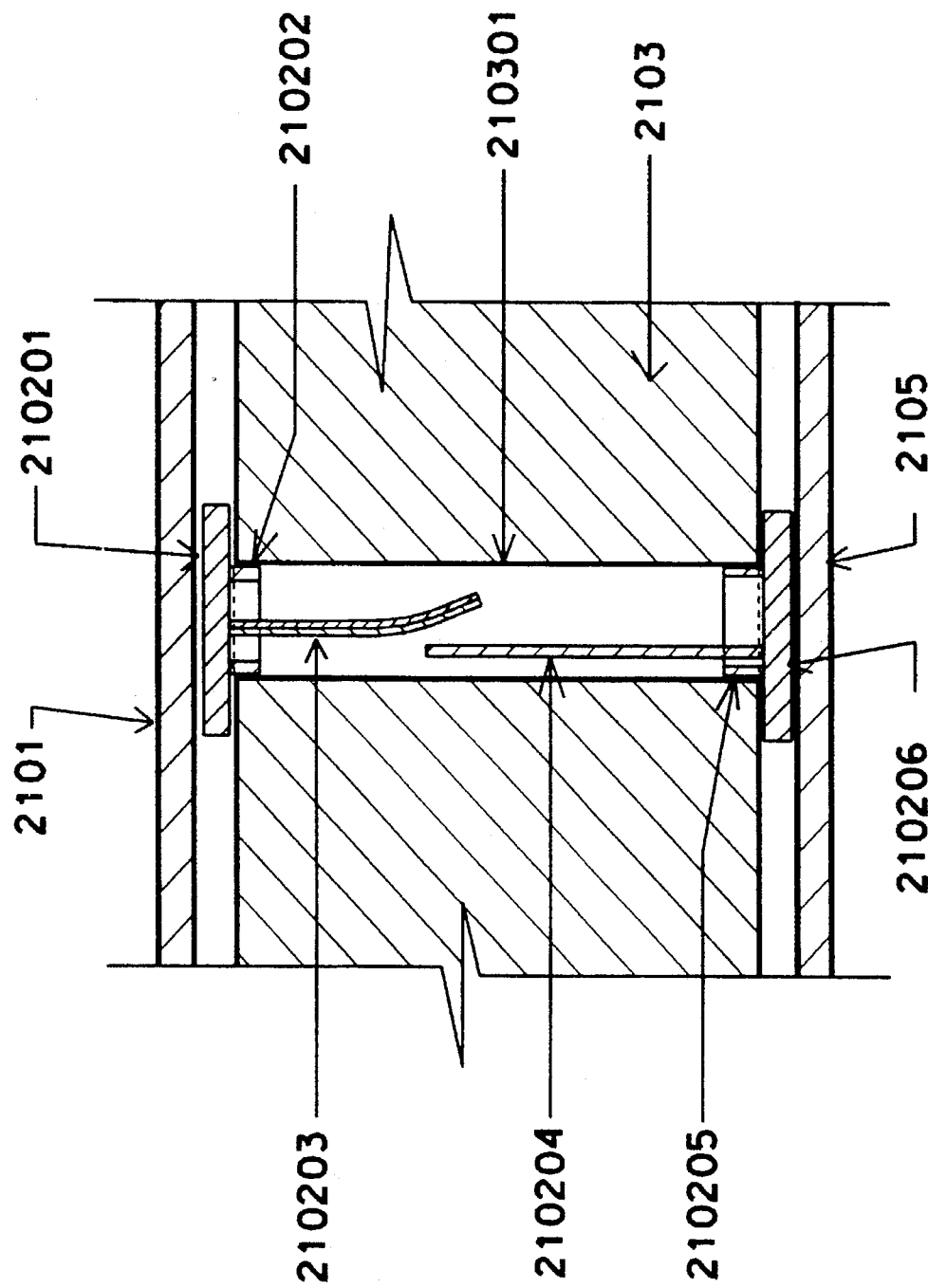
Figure 24:
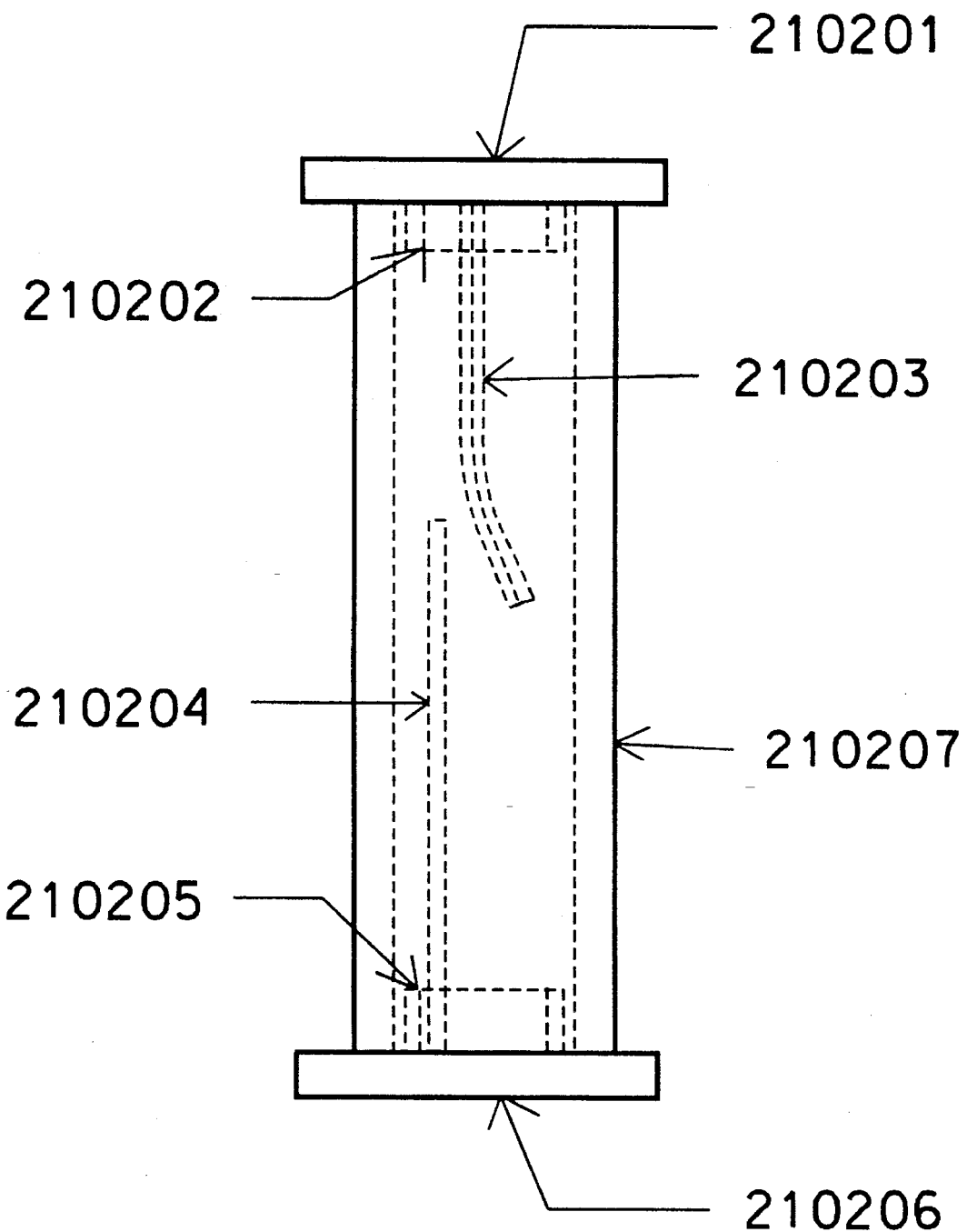
Figure 25:
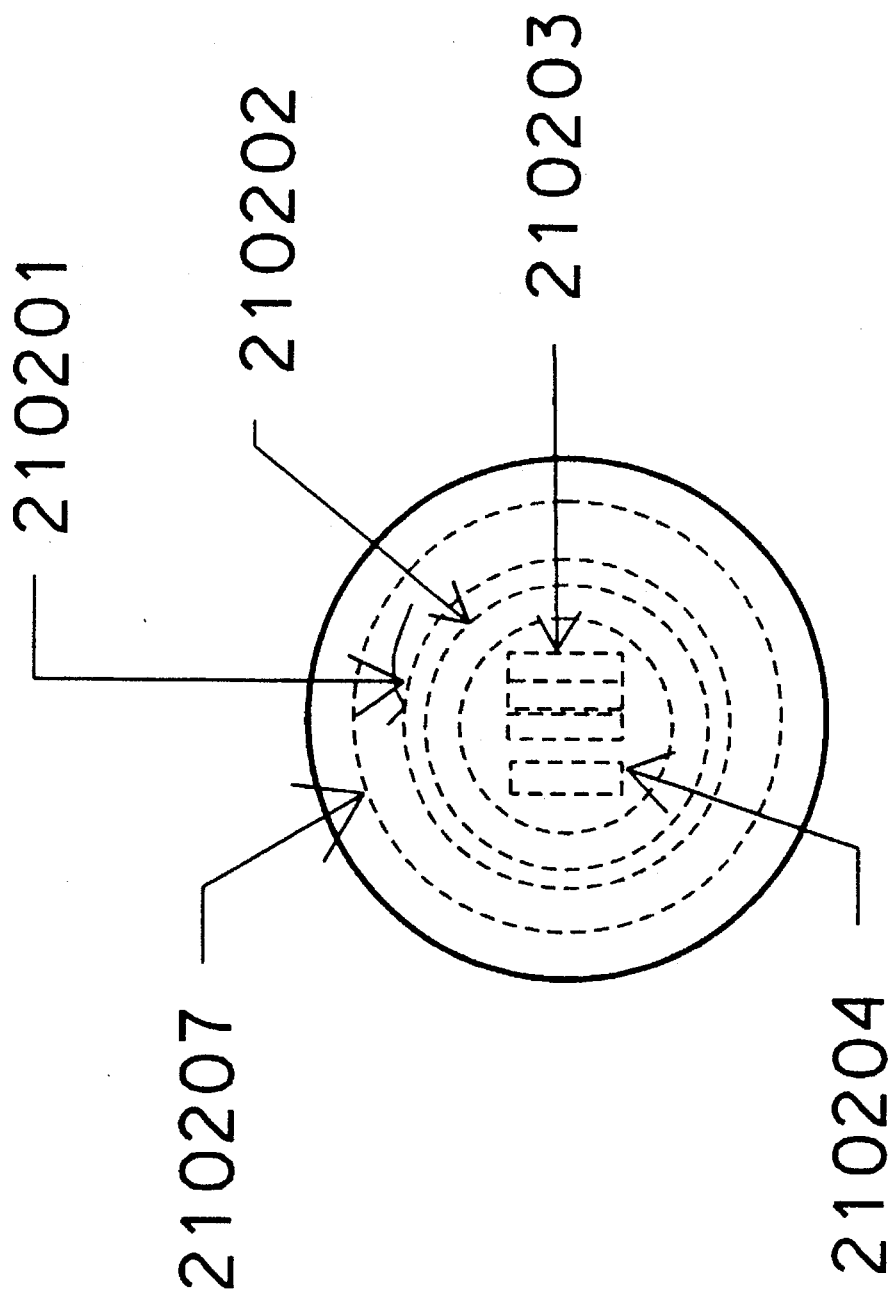
Figure 26:
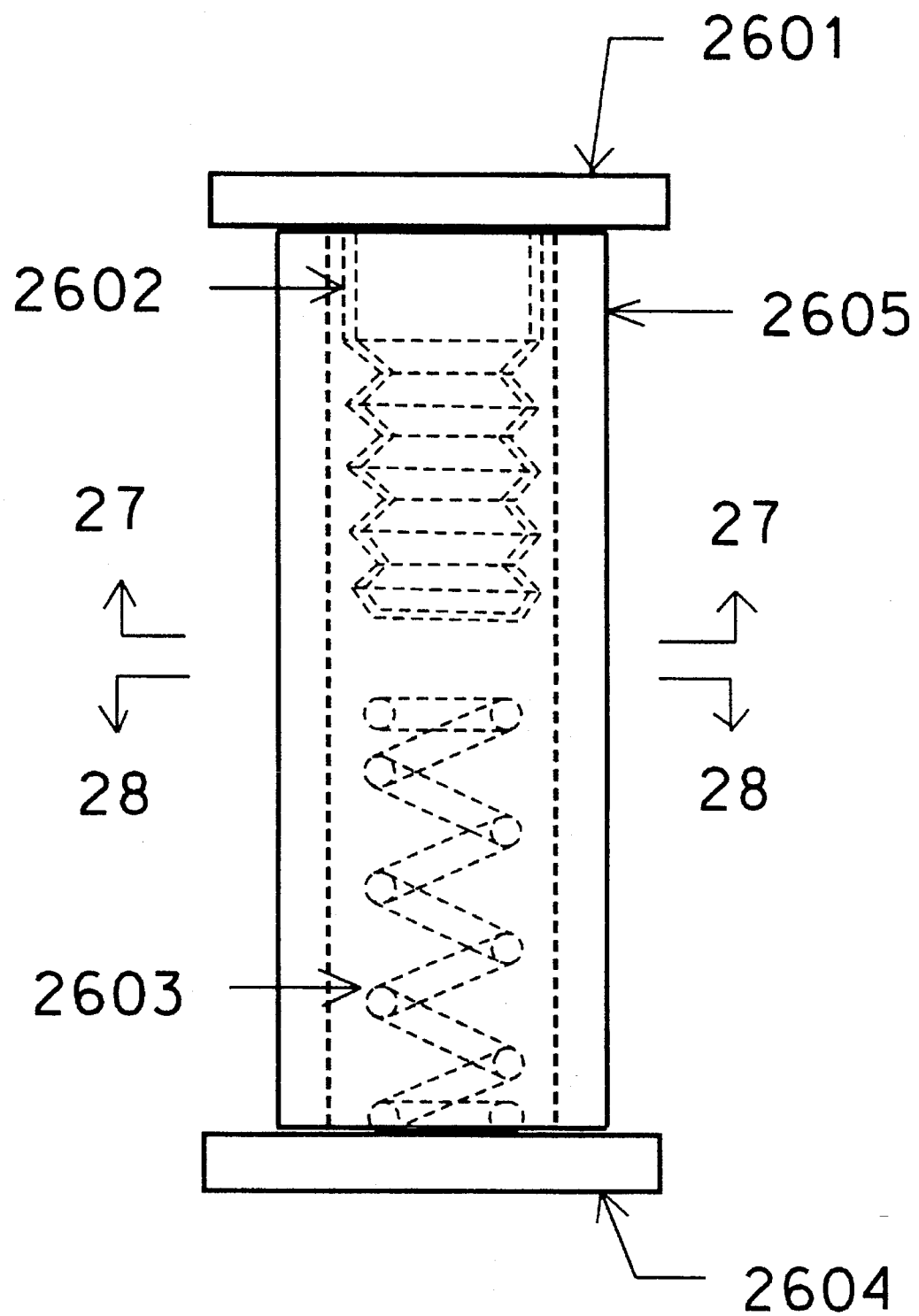
Figure 27:
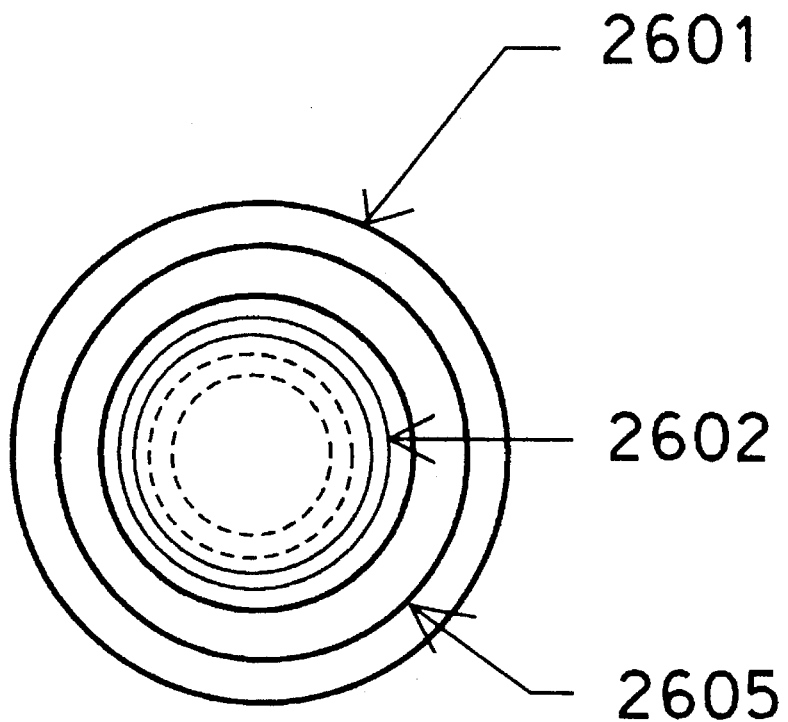
Figure 28:
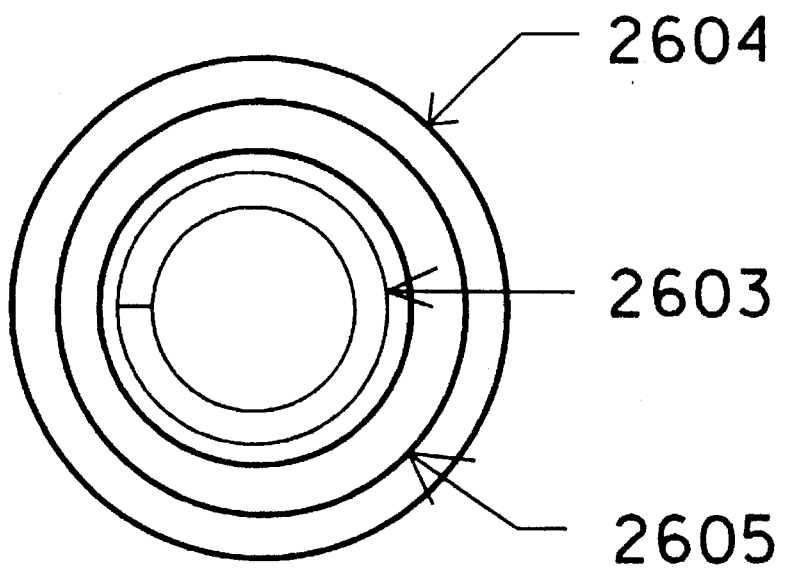
Figure 29:
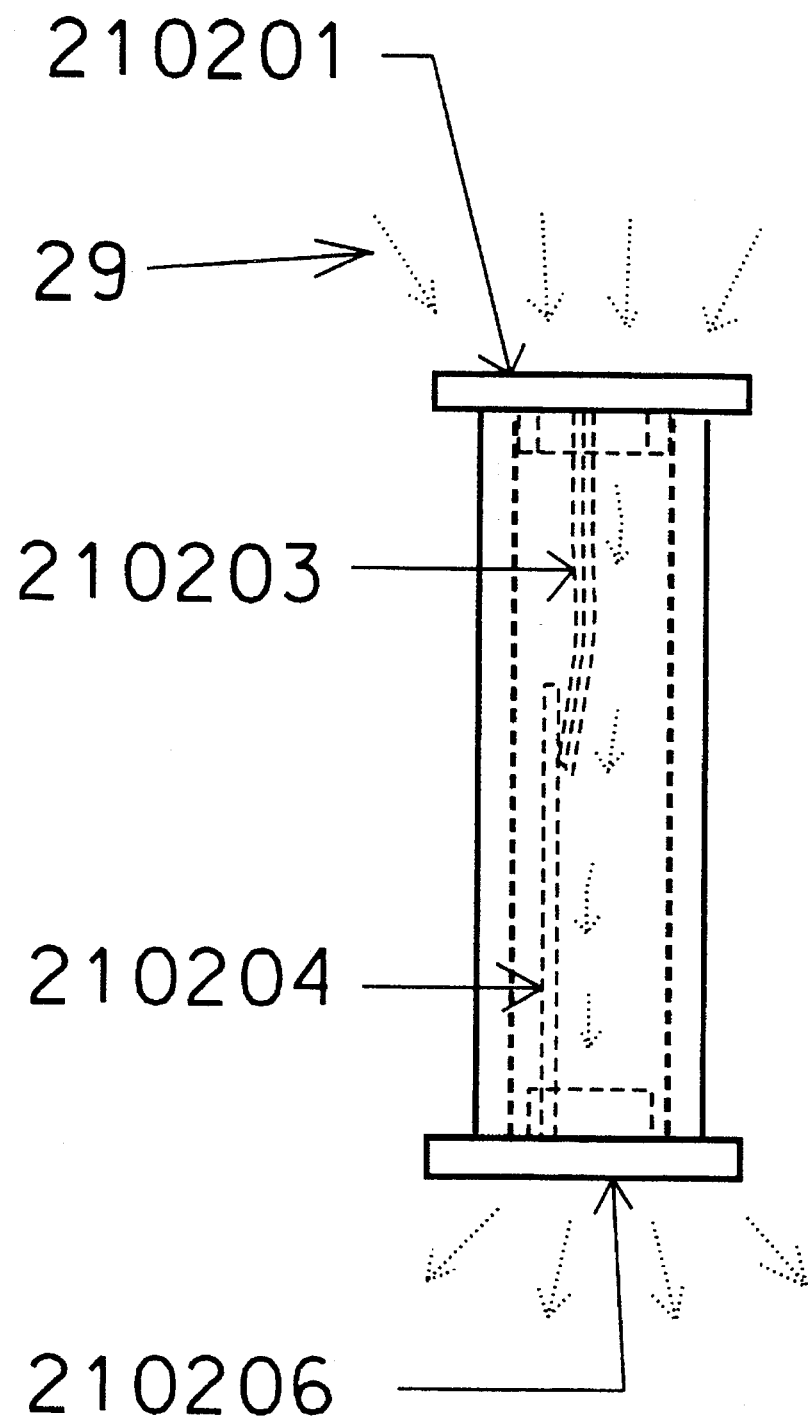
Figure 30:
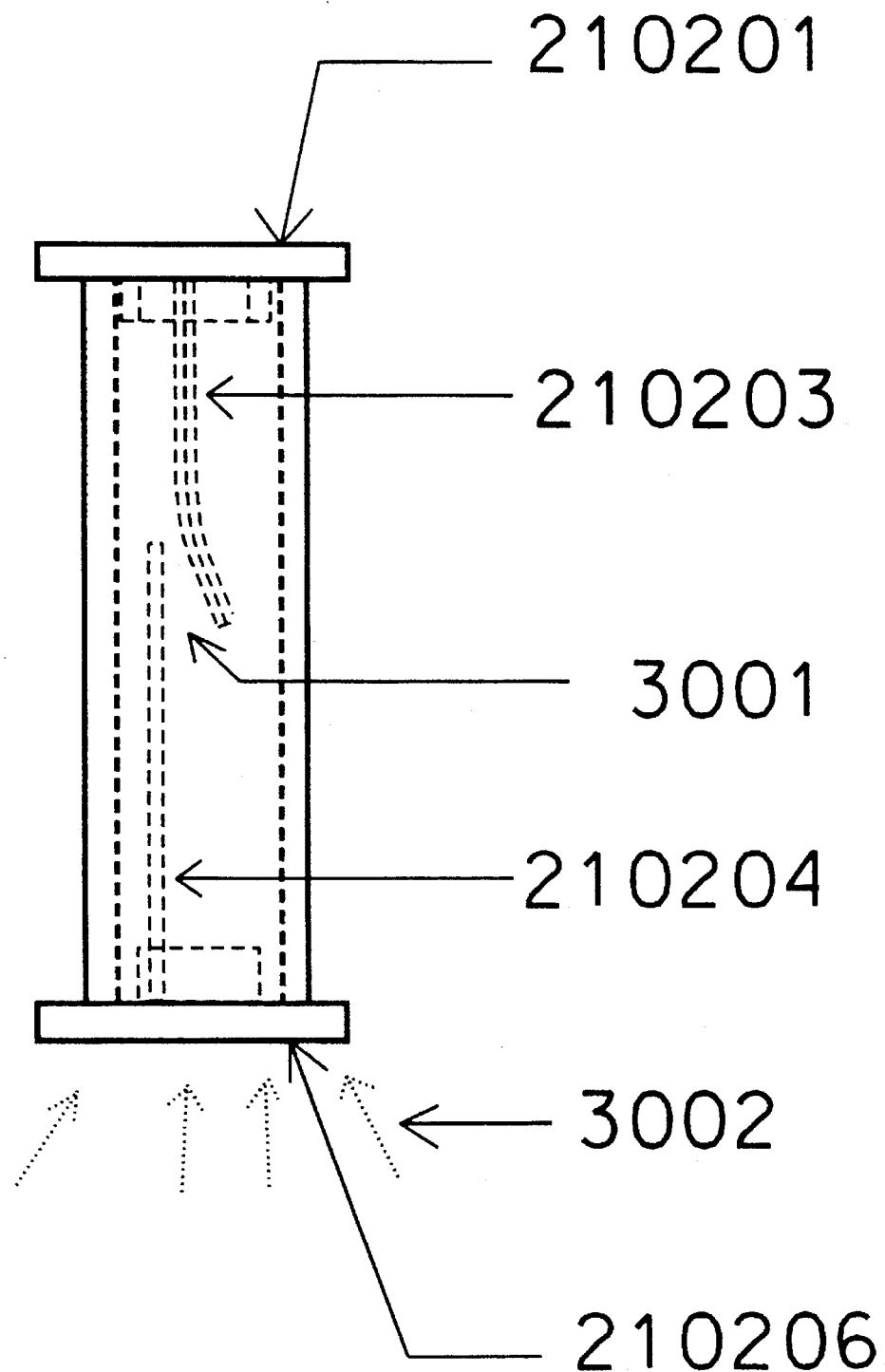
Figure 31:
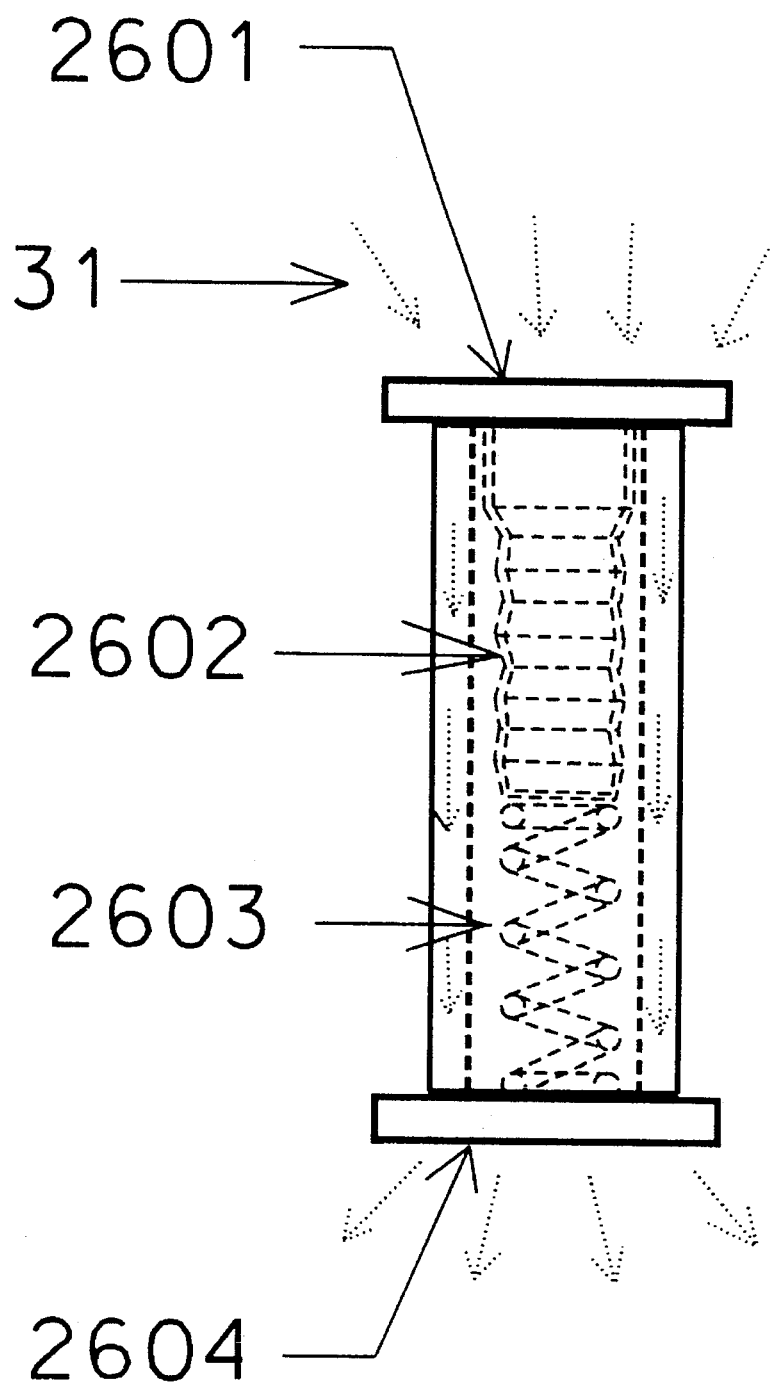
Figure 32:
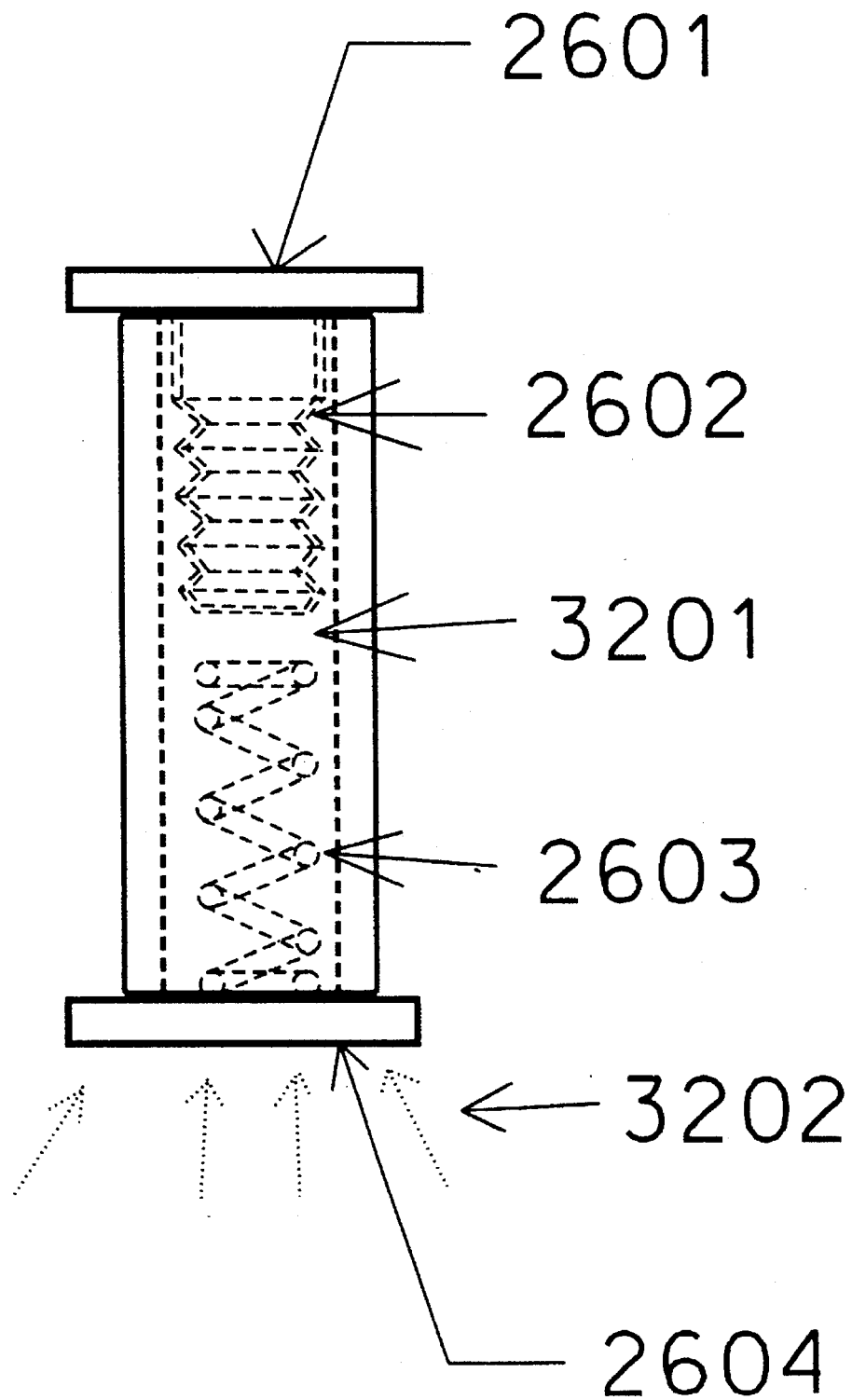
Figure 33:
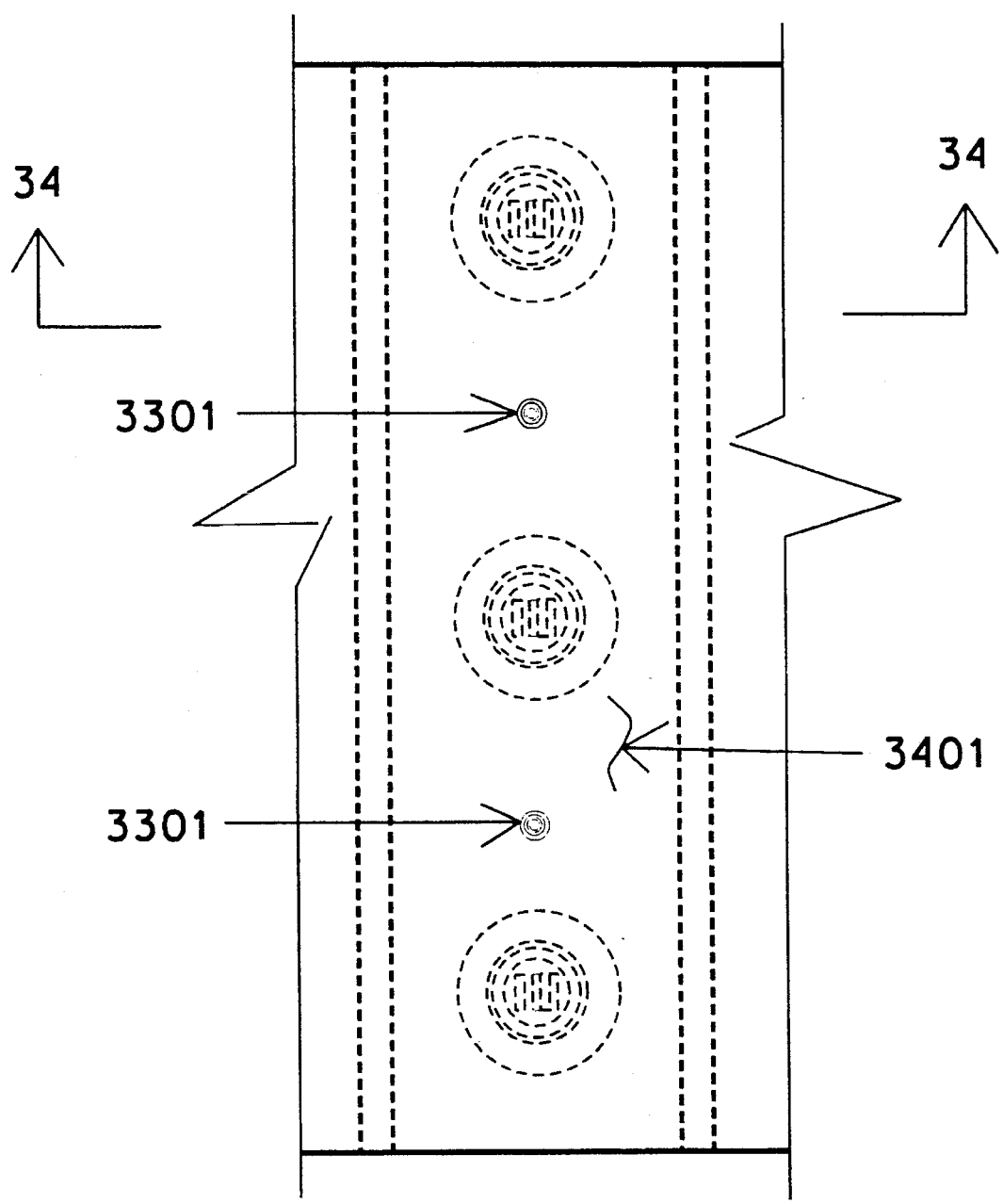
Figure 34:
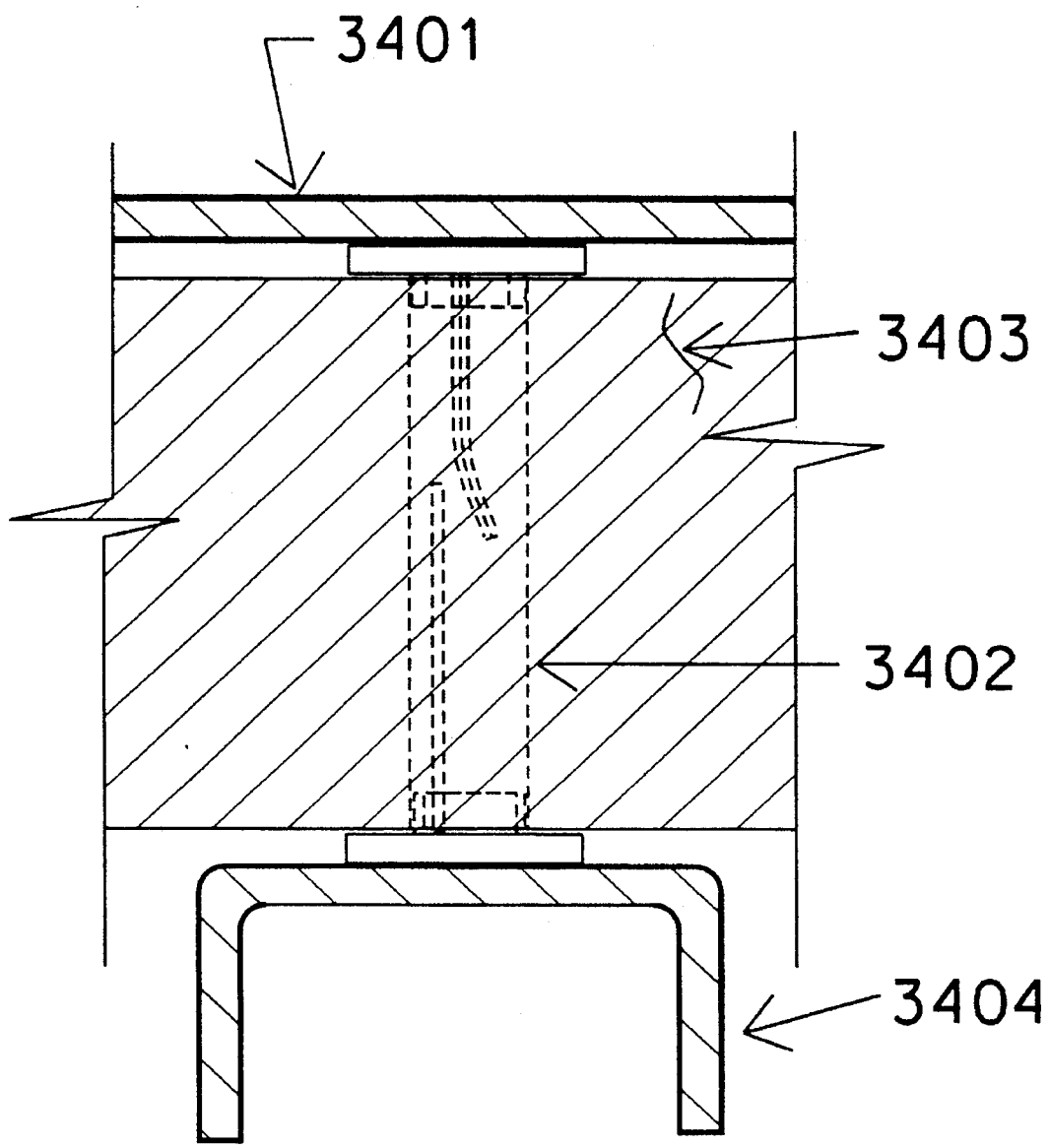
Figure 35:
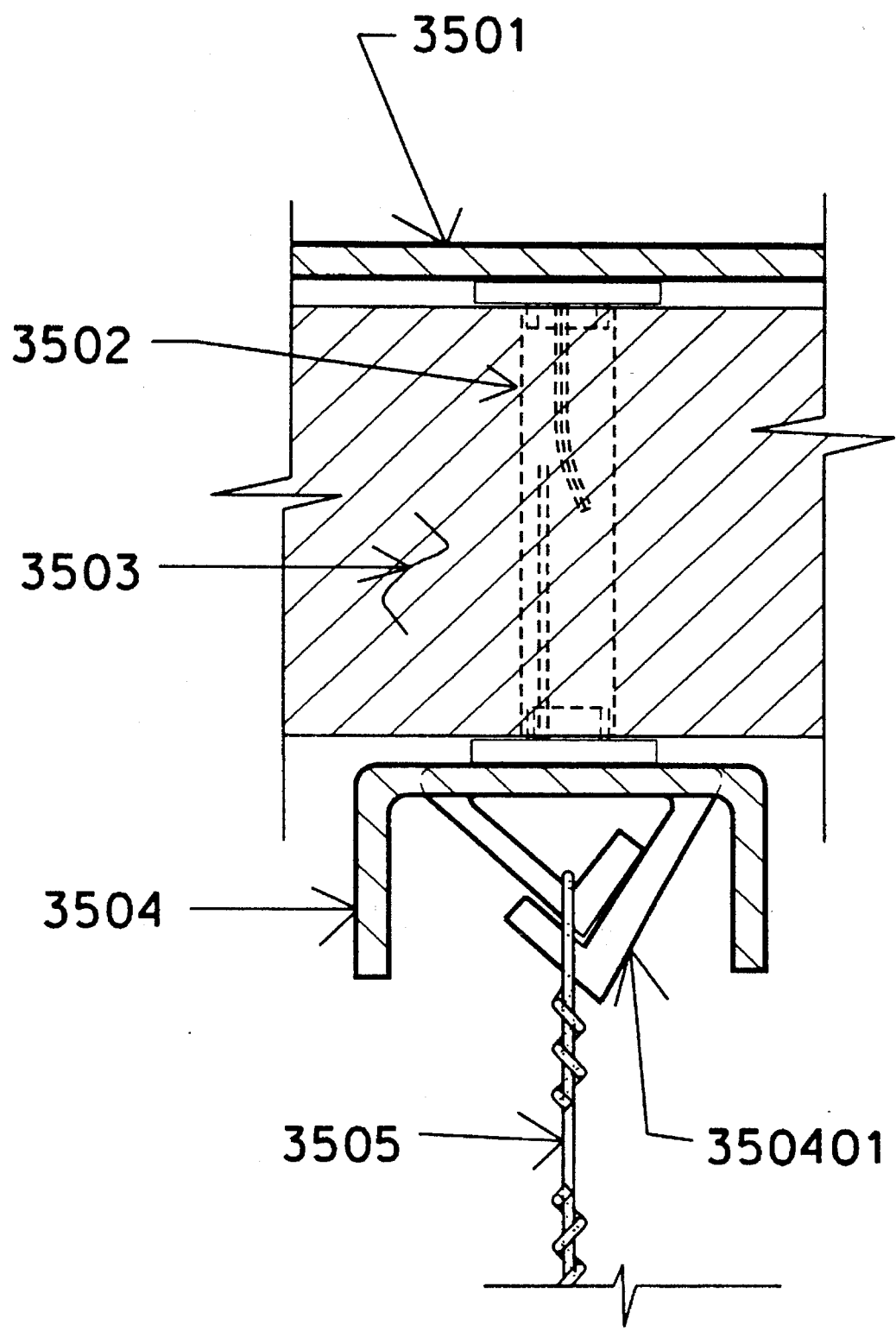
Figure 36:
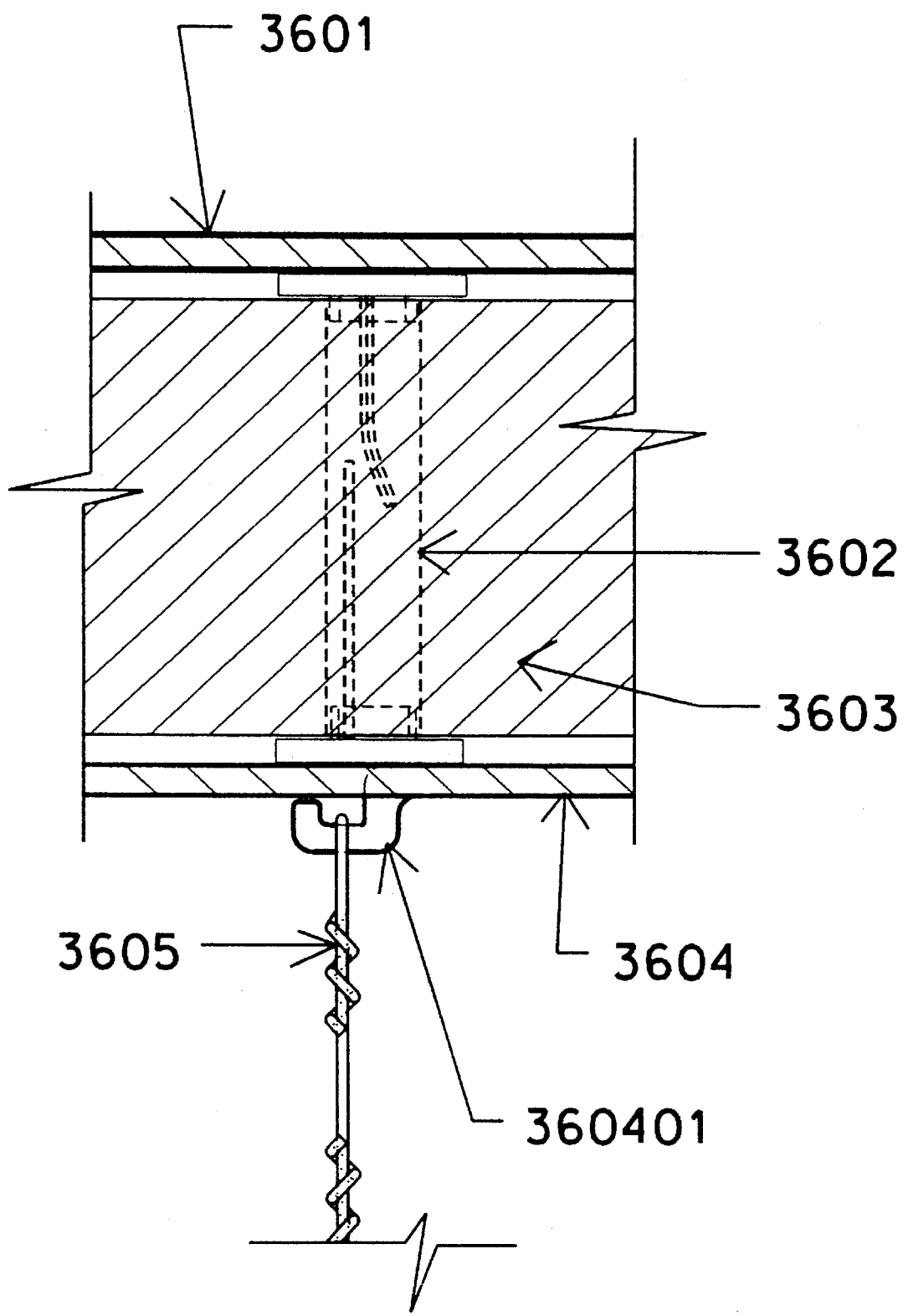

FIGS. 9, 10, and 11 are section views which illustrate details of components of a form of the invention;

FIGS. 12, 13, 14, and 15 are enlarged views of portions of the invention;

FIGS. 16 and 17 are schematic drawings of a metal chain element;

FIG. 18 is a partial elevation view of a further variation of the device of the invention;

FIGS. 19 and 20 are a partial plan view and a partial elevation view respectively of another variation of the device of the invention;

FIGS. 21 and 22 are a plan view and an elevation view, respectively, of yet another variation of the device of the invention;

FIG. 23 is an enlarged sectional view of a one directional heat conductor, usable in a float of the invention;

FIGS. 24 and 25 are an elevation view and a plan view, respectively, of a variation of the one directional heat conductor;

FIGS. 26, 27 and 28 are an elevation view, and two sectional plan views, respectively, and taken on lines 27—27 and 28—28 of FIG. 26 of another variation of the one directional heat conductor device;

FIGS. 29 and 30 illustrate the functioning of the one directional heat conductor, FIG. 29 illustrating the conduction of heat from the upper plate to the lower plate, and FIG. 30 showing that the heat cannot be conducted efficiently from the lower to the upper plate because of a gap between the upper conductor and the lower conductor;

FIGS. 31 and 32 illustrate the functioning of another variation of the one directional heat conductor device, and FIG. 31 illustrates the conduction of heat from the upper plate to the lower plate; and FIG. 32 shows that heat cannot be conducted efficiently from the lower plate to the upper plate because of a gap formed between the upper conductor and the lower conductor;

FIG. 33 is a partial plan view of yet another variation of the floating solar pool heater, and FIG. 34 is a section taken on lines 34—34 of FIG. 33; and FIGS. 35 and 36 are two partial sectional views of two further variations of the floating solar pool heater.

DETAILED DESCRIPTION

Figure 1:
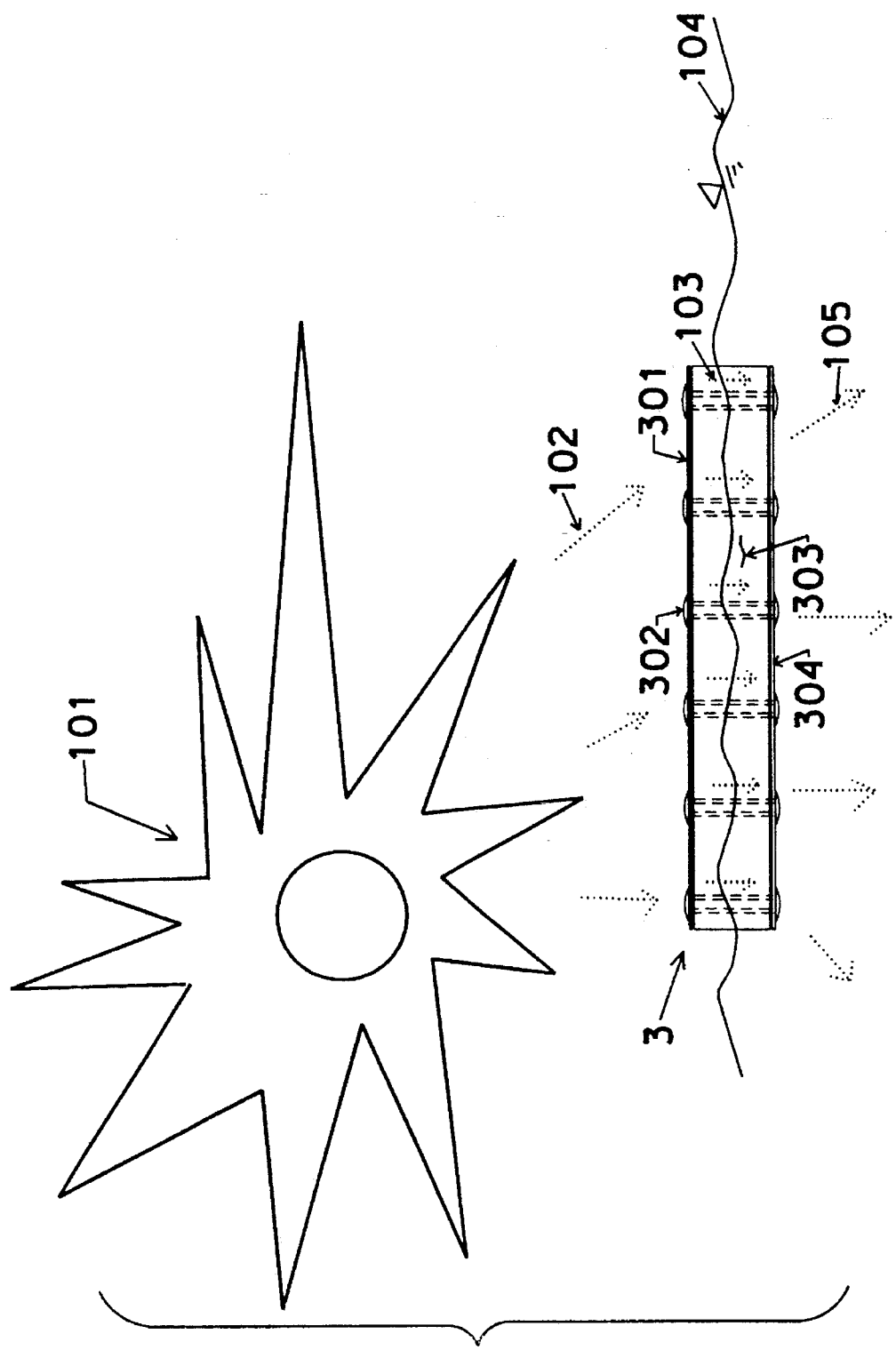
FIG. 1 illustrates the use of one form of solar pool heater unit, of the invention.
Figure 2:
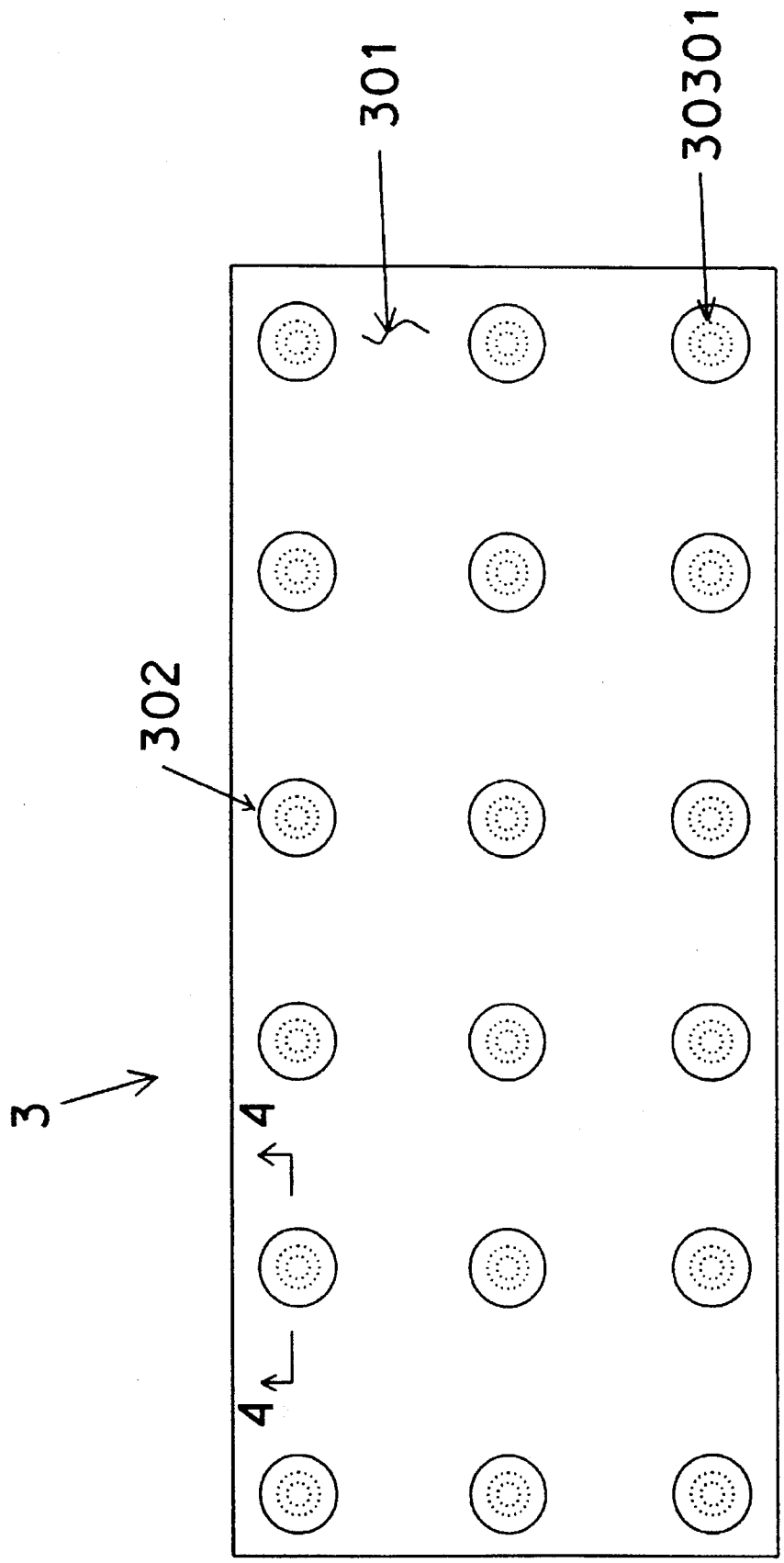
FIGS. 2 and 3 are a plan view and an elevation view, respectively, of one of a solar pool heater unit, of the invention.
Figure 3:
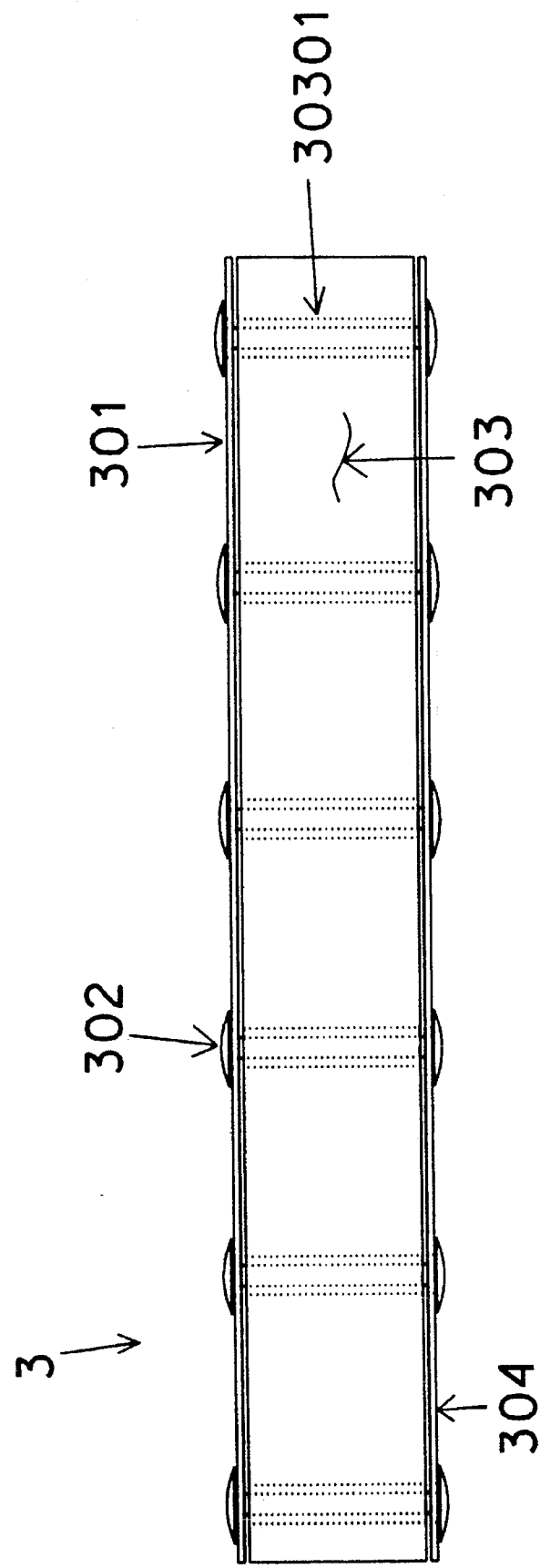
Figure 4:
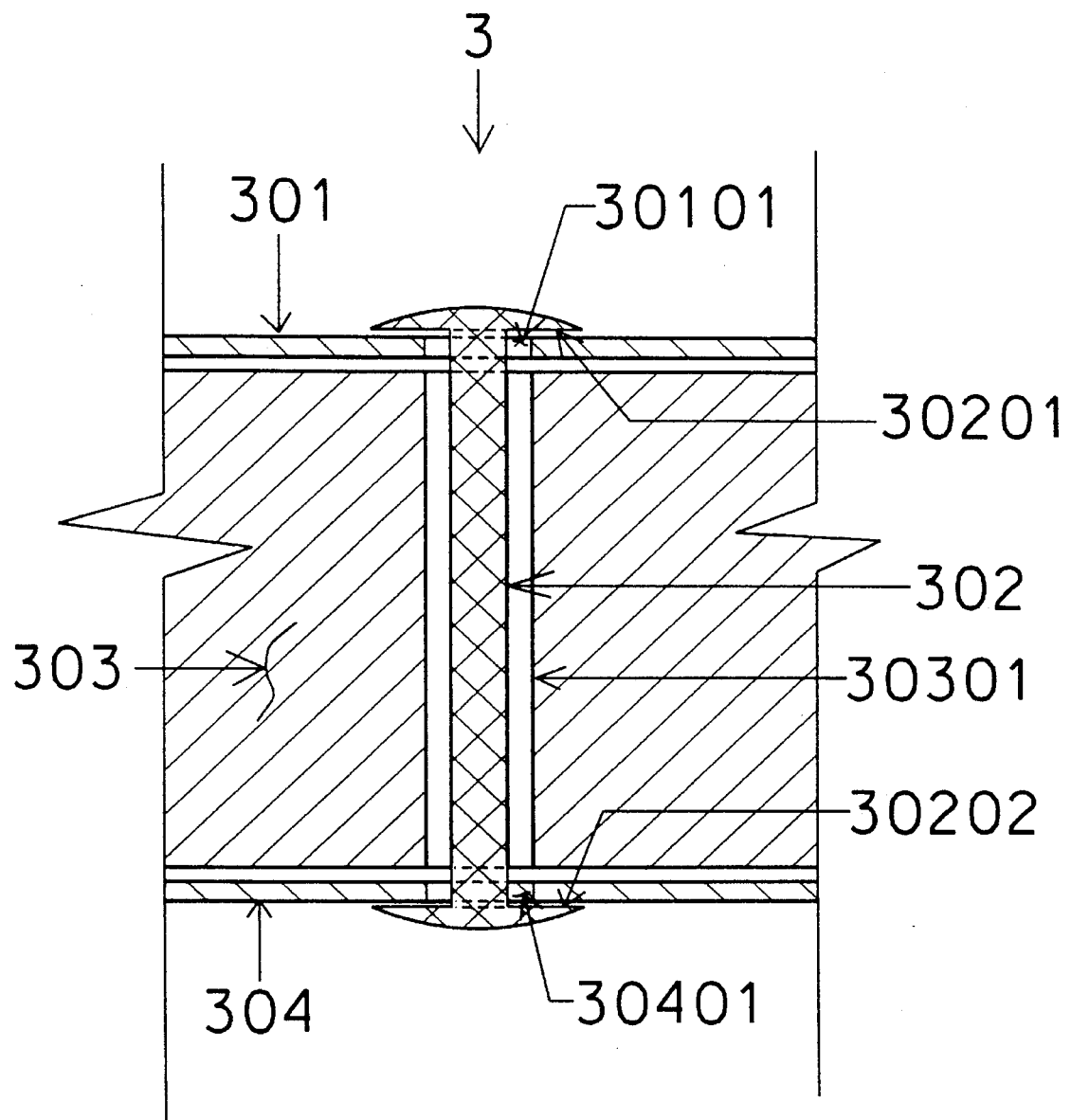
FIG. 4 is an enlarged sectional view of a basic component of one of the invented devices.

Referring to FIGS. 1—4, a floating solar pool heater unit 3 includes a solar energy collector upper plate 301, energy conductor connector rivets 302, a float body typically consisting of plastic foam 303, and one or more energy dispersing lower plates 304. The solar energy collector plate 301 typically comprises a thin metal plate with multiple like holes, one of which is referenced as 30101 in FIG. 4. The upper surface of the solar energy collector plate 301 preferably but not necessarily has dark color to absorb solar energy efficiently. The heat energy dispersing plate 304 is a typically thin flat, L-shaped or U-shaped metal plate with multiple holes, one of which is shown as 30401 in FIG. 4. Flat type energy dispersing plates are shown in FIGS. 2, 3 and 4. The float foam of body 303 is a light weight heat insulative foam, such as a polystyrene foam.

There are typically many holes, such as 30301, on or through the float foam. The energy conductor rivets are typically metal rivets to conduct heat efficiently. The float foam is typically sandwiched between the solar energy collector plate 301 and the energy disperse plate(s) 304. The energy conductor rivets penetrate the holes 30101, 30301 and 30401 and rivet together the solar energy collector plate, the float foam, and the energy dispersing plate(s) to form the unit 3. The bottom surface of the energy conductor rivets' top heads, 30201, and the top surfaces of the energy conductor rivets' bottom heads contact the solar energy collector plate 301, and the energy dispersing plate 304, respectively, to efficiently transfer heat, by conduction, to plate 304, for transfer to the pool water. Unit 3 can have any plan shape, although a rectangular shape is shown in the Figures.

Referring to FIG. 1, in employing the invented device, the pool heater unit 3 is placed into the pool's water 104, with the solar energy collector plate 301 facing upwards. The float foam 303 maintains the flotation of the heater unit. When the sun 101 is shining, its rays 102 will spread or transmit solar energy onto the solar energy collector upper plate 301. Plate 301 will be heated and heat will be conducted downwards as indicated by the heat transfer path through the energy conductor rivets 103, since the heads of the energy conductor rivets contact the solar energy collector plate and the energy disperse plate. The energy dispersing plate 304 will further exchange its received heat with the pool water as symbolically indicated by the heat transfer path into water 105.

Figure 5:
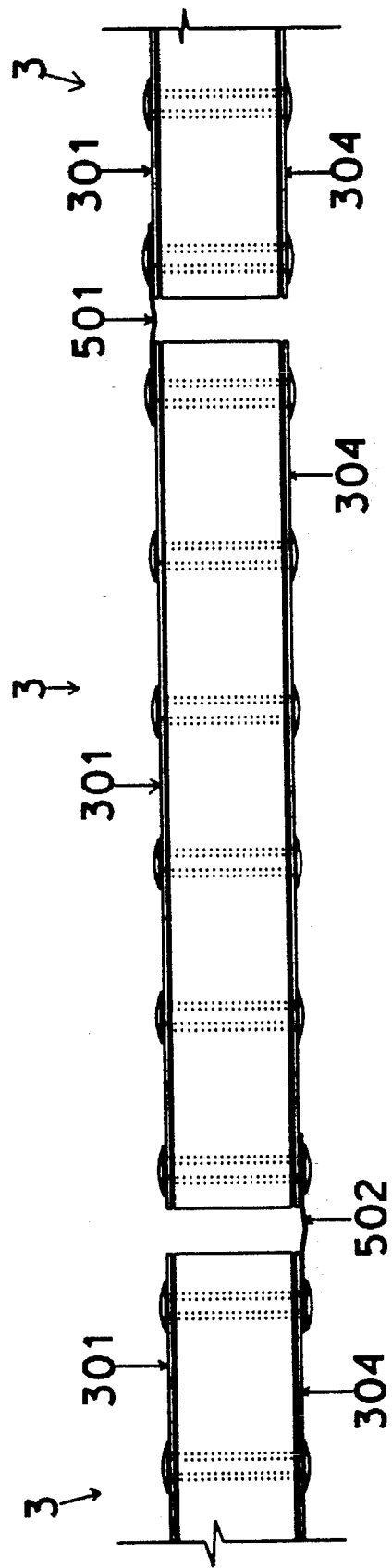
FIG. 5 is an elevation view which illustrates a method of connecting two or more of the floating solar pool heater units of the invention.
Figure 6:
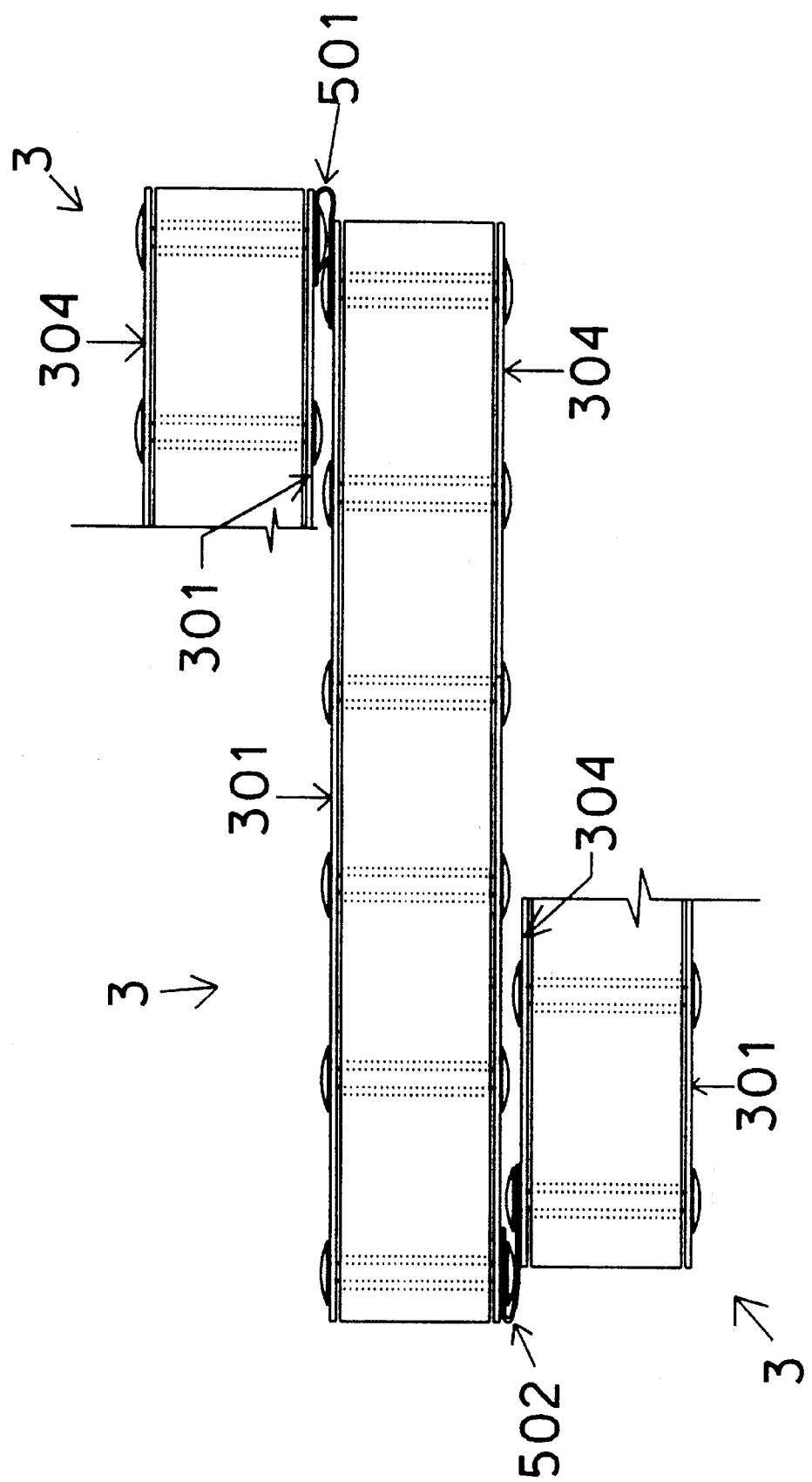
FIG. 6 is an elevation view which illustrates how the connected floating solar pool heater units can be stacked when not being used.
Figure 7:
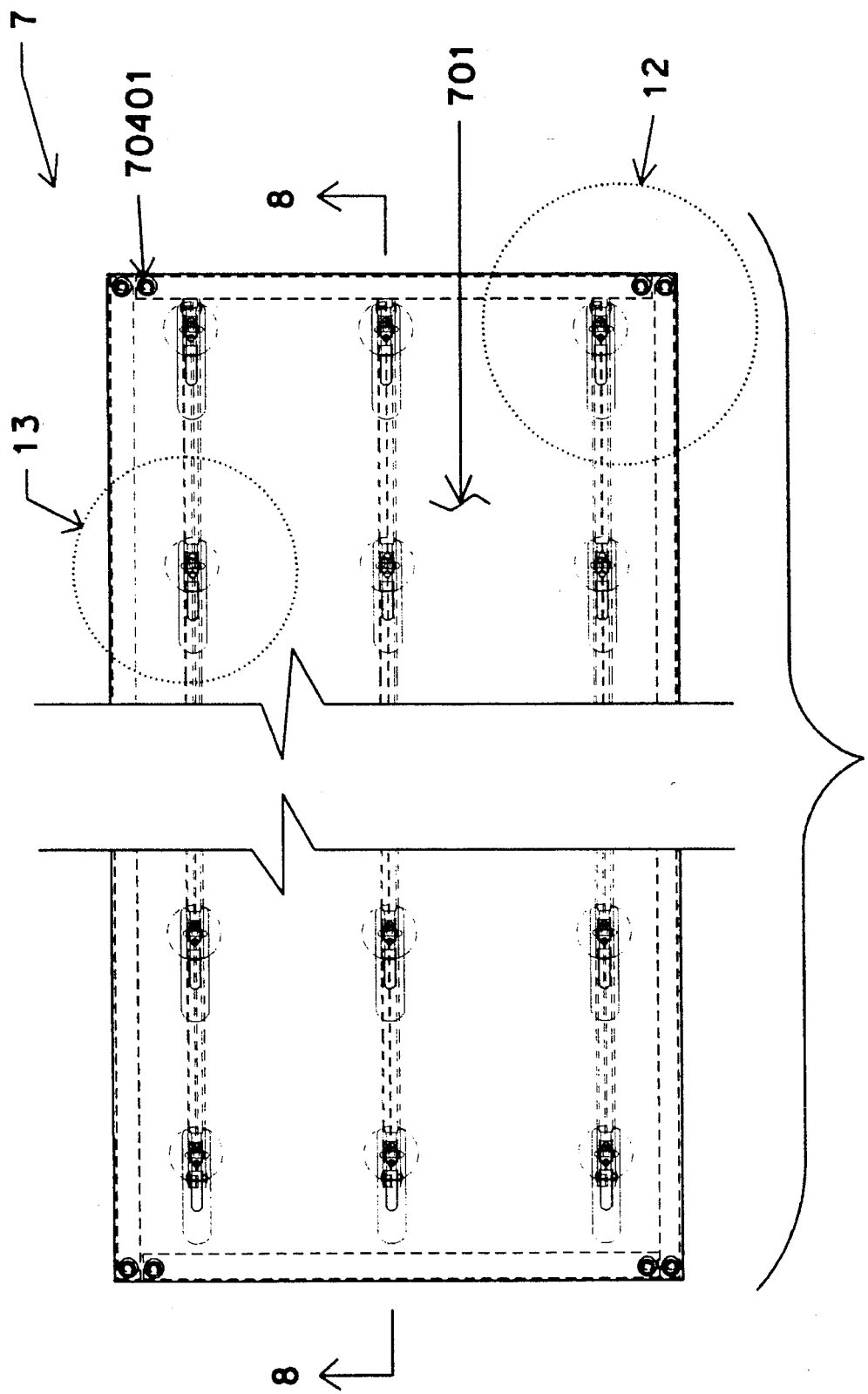
FIGS. 7 and 8 are a plan view and elevation view which illustrate details of components of a form of the invention.
Figure 8:
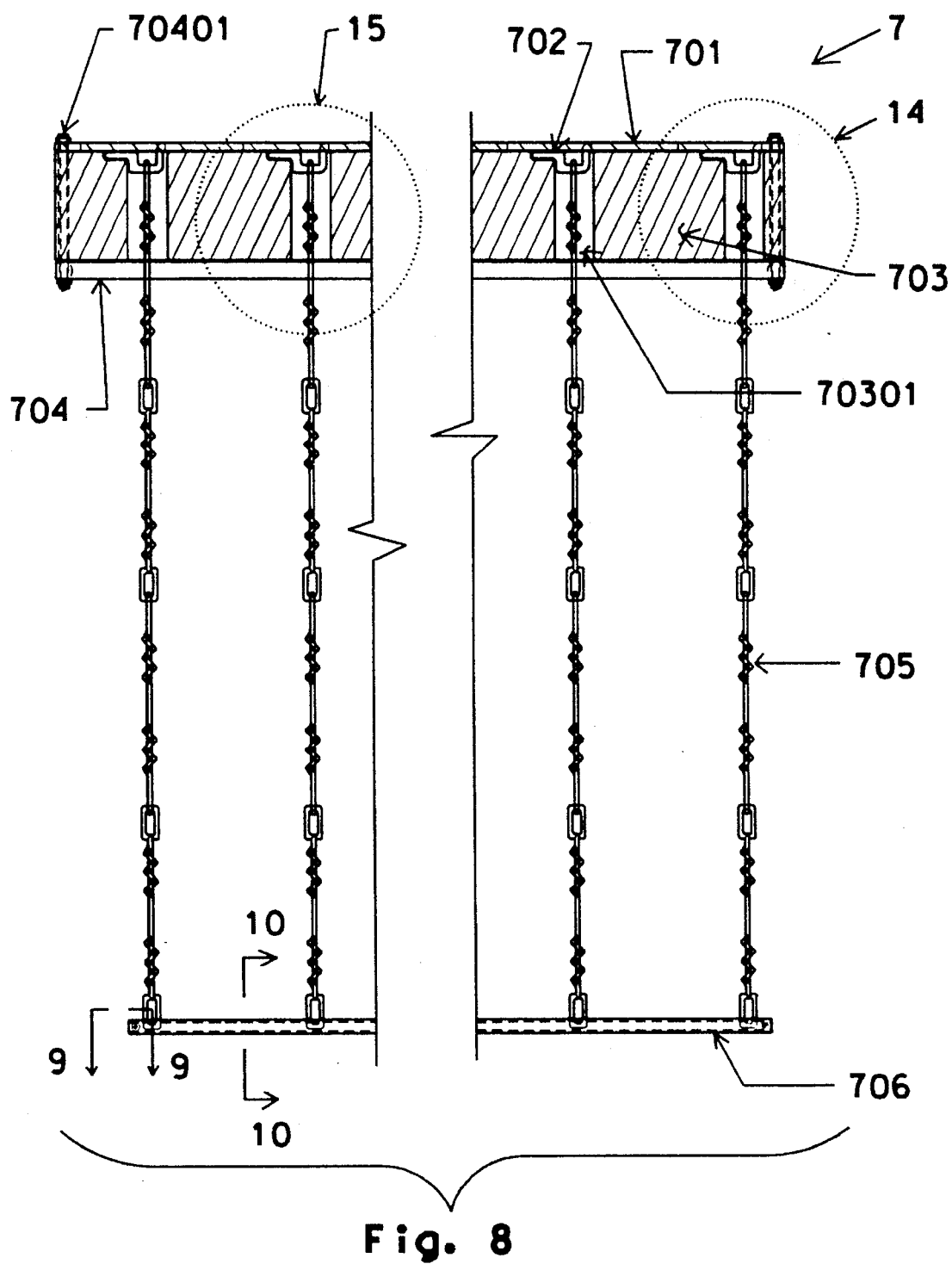

Unit 3 can be used individually as shown in FIG. 1, or can be used jointly to form a row of units. Referring to FIG. 5, one way to join the invented units together is to connect adjacent units with connecting membranes, 501 and 502. A typical connecting membrane is a narrow strip or web of flexible plastic sheet material, with holes along its edges, longitudinally. Each edge of the connecting membrane is retained by the energy conductor rivet extending along an edge of an adjacent floating solar pool heater unit. Edges of certain units can be joined together by a connecting membrane at their bottom sides, shown as 502, while edges of other units can be joined together at their top sides, by a membrane shown at 501. The purpose of joining is to enable the joined units to be easily stored. When the joined units are not used, they can be removed from the pool and folded and stacked together with their top sides facing each other and their bottom sides facing each other, as in FIG. 6, for storage. The connecting membranes can be replaced with other means as an alternate way of enabling such deployment in one plane, and folding and stacking in multiple parallel planes.

Units 3 can be used jointly to form a pool cover. In general, the warmer the pool water is, the faster algae grows in the pool. However, because heater units 3 have metal top plates, they do not allow sun rays to penetrate to the pool water. Therefore, when units 3 are used as a pool cover, they can deter algae growths in the pool, since the algae growths require sun rays. This is another advantage of using the devices of the invention.

FIGS. 7 through 17 show a second variation of the floating solar pool heater unit. The floating solar pool heater unit 7 comprises a solar energy collector plate 701, a float body consisting of foam 703, a bottom frame 704, and many energy dispersing members such as hanging chains 705, and optimal chain spacing guides 706. The solar energy collector plate 701 is a thin metal plate with holes for mounting or connecting devices such as rivets or bolt-nut-washer assemblies. The chain hook 702 is bent from a partially punched-out strip of the solar energy collector plate.

The upper surface of the solar energy collector plate preferably but not necessarily, has dark color to absorb solar energy efficiently. The energy dispersing chain is composed of metal chain elements 17 seen in FIG. 17. The float foam consists of a light weight foam such as a polystyrene foam. There are many holes such as 70301 on or in the float foam. The bottom frame 704 has holes for mounting devices 70401, such as rivets or bolt-nut-washer assemblies. A chain spacing guide 706 consists of two pieces of C-shaped strip of any suitable material such as plastic. One edge of each of the C-shaped strips has many half circular holes. When the two C-shaped strips are put together, the two half circular holes will form a full hole 70601.

In the construction of a floating solar pool heater unit 7, the float foam will be sandwiched between the solar energy collector plate and the bottom frame. Each of the heat dispersing chains is connected onto a chain hook, and displaced through a hole 70301 in the float foam. The mounting devices 70401 such as bolts penetrate vertically through the bottom frame, the float foam, and the solar energy collector plate, and fasten them together. Chain spacing guides fasten the bottoms of the energy disperse chains in a row, by allowing each of the two legs of their bottom rings to be put into each of the holes 70601. The two C-shaped strips of the chain spacing guides are fastened together by rivets, 70602, at their longitudinal ends.

The described floating solar pool heater 7 can have any plan shape, although a rectangular shape is shown in the Figures.

A third variation is similar to the second variation. The differences between these two variations are in the solar energy collector plate, the chain hook and the upper rim of the hole of the float foam. Referring to FIG. 18, unlike the solar energy collector plate 701 which has many "punched-out" chain hooks for the second variation, the solar energy collector plate, 1801, for this variation is a continuous flat plate with only a few holes on its edges or corners for receiving penetration of the mounting devices. The chain hook 1802, for this variation is a U-shaped metal bracket which is mounted between the solar energy collector plate and the float foam 1803 and connected to 1801. The upper rim of the hole 180301 has a recessed area and is so shaped that it ensures that the upper surfaces of the chain hooks contact the lower surface of the solar energy collector plate but not significantly extending above the rim of the hole 180301.

In the construction of this floating solar pool heater unit, the float foam is sandwiched between the solar energy collector plate and the bottom frame, 1805. Each of the energy disperse chains 1804, is hooked onto each of the chain hooks and fed through a hole 180301 in the float foam. The chain hooks are located between the solar energy collector plate and the float foam. The mounting devices 1806 penetrate the bottom frame, the float foam, and the solar energy collector plate and fasten them together. The chain spacing guide, not shown in FIG. 18, fastens the bottoms of a row of the energy disperse chains, as in the second variation. This floating solar pool heater unit can also have any plan shape. Thus, the construction of this variation of the invented device is almost the same as the second variation.

In the construction of this floating solar pool heater unit, the float foam is sandwiched between the solar energy collector plate and the bottom frame 1805. Each of the energy dispersing chains 1804 is hooked onto each of the chain hooks and fed through a hole 180301 in the float foam. The chain hooks are located between the solar energy collector plate and the float foam. The mounting devices 1806 penetrate the bottom frame, the float foam, and the solar energy collector plate and fasten them together. The chain spacing guide, not shown in FIG. 18, fastens the bottoms of a row of the energy disperse chains as in second variation. This floating solar pool heater unit can also have any plan shape.

A fourth variation is similar to the second variation. The differences between these two variations are in the solar energy collector plate, the chain hook and the hole in the float foam. Referring to FIGS. 19 and 20, unlike the solar energy collector plate 701 on which has many "punched-out" chain hooks for the second variation, the solar energy collector plate 2001, for this variation is a continuous, flat plate with only a few holes on its edges or corners for receiving penetration of the mounting devices. The chain hook 2002, for this variation is a metal strip with a few punched-out strips bent into hooks or brackets. Unlike having holes in the float foam for the second variation, this fourth variation has slots 200301 in the float foam 2003. The chain hook is placed inside a slot 200301 and between the solar energy collector plate and the bottom frame 2006. The upper rim of the slot 200301 has a recessed area, and is so shaped that it can ensure that the upper surfaces of the chain hooks contact the lower surface of the solar energy collector plate but not significantly extending above the rim of the slot 200301.

In the construction of this floating solar pool heater unit, the float foam is sandwiched between the solar energy collector plate and the bottom frame. Each of the energy dispersing chains 2004, is hooked onto each of the chain hooks and fed through a hole 200301 in the float foam. The chain hooks are located between the solar energy collector plate and the bottom frame. The mounting devices 2005, penetrate the bottom frame, the float foam, and the solar energy collector plate and fasten them together. The chain spacing guide 2007 fastens the bottoms of a row of the energy dispersing chains, as in the second variation. This solar pool heater unit can have any plan shape. Thus, the construction of this variation is almost the same as the second variation.

Referring to FIGS. 21, 22 and 23, the fifth variation of the pool heater unit 21, comprises a solar energy collector plate 2101, many one-directional heat conductors 2102, a float body made of foam 2103, many fastening means or devices 2104, and an energy dispersing plate 2105. The solar energy collector plate comprises a thin metal plate with many holes for receiving the penetration of the fastening means or devices. The upper surface of the plate 2101 preferably but not necessarily has dark color to absorb solar energy, efficiently. The energy dispersing plate 2105 is typically a thin flat metal plate with multiple through holes. The float foam is a body made of a light weight foam such as a polystyrene. The fastening means is typically a bolt-nut-washer set.

There are two types of uni-directional heat conductors employed.

The first type is shown in FIGS. 21, 22, 23, 24 and 25. Referring to FIG. 24, this type consists of an upper plate 210201, an upper plate ring 210202, an upper conductor 210203, a lower conductor 210204, a lower plate ring 210205, a lower plate 210206, and an optional conductor tube 210207. Each of the upper and lower plates is a small metal plate. Each of the upper plate ring and lower plate ring is a ring-like or semi- ring-like metal extrusion from the respective upper or lower plate. The lower conductor is a short metal rod or strip extruding from the lower plate on the lower plate ring side. The upper conductor is a bimetal extending from the upper plate on the upper plate ring side. The bimetal is so selected that it will bend when heated. The conductor tube 210207 is a short conmetallic tube of which the inside diameter is slightly larger than the outside diameter of the lower plate ring and that of the upper plate ring. Referring to FIGS. 21, 22 and 23, there are many holes, such as 210301, in the float foam. The hole 210301 has diameter which is slightly larger than that of the upper plate ring, of the lower plate ring or of the conductor tubes, but is smaller than the size of the upper plate or the lower plate. In the construction of a floating solar pool heater unit of the first type with uni-directional heat conductors which do not have the conductor tubes, the upper conductors and the lower conductors are dispersed into the holes 210301 with the upper plates on the same face of the float foam; with the upper plate rings and the lower plate rings inside the holes; with the upper plates and the lower plates outside the holes; with the upper conductors not touching the lower conductors. The float foam together with the uni-directional heat conductors are sandwiched by the solar energy collector plate and the energy disperse plate. The fastening means penetrates the solar energy collector plate, the float foam and the energy disperse plate and fastens them together to form the unit device. The bottom of the lower plate and the top of the upper plate of each type of the first variation of the one directional heat conductor contact the energy dispersing plate and the solar energy collector plate, respectively. The unit can have any plan shape, although a rectangular one is shown in the figures.

Referring to FIGS. 26, 27 and 28, the second type of the uni-directional heat conductor consists of an upper plate 2601, an upper conductor 2602, a lower conductor 2603, a lower plate 2604, and an optional conductor tube 2605. Each of the upper and lower plates is a small metal plate. The upper conductor is a small metal container with bellows-like side walls. The upper conductor extends downwardly from the upper plate and encloses a sealed-up air space. The lower conductor is a metal spring. The lower conductor extends upwardly from the lower plate. The conductor tube 2605 is a short non-metal housing or tube whose inside diameter is slightly larger than the outside diameter of the upper conductor and the lower conductor. The holes 210301 in the float foam body have diameters which are slightly larger than that of the upper conductors, the lower conductors or the conductor tubes, but are smaller than the overall size of the upper plate or the lower plate.

During normal temperature, the combined length of an upper conductor and a lower conductor is less than the length of the conductor tube or the thickness of the float foam.

In the assembly of a floating solar pool heater unit with the second type of uni-directional heat conductors which do not have the conductor tubes, the upper conductors and the lower conductors are placed into the holes 210301 with the upper plates 2601 on the same face of the float foam; with the upper plates 2601 and the lower plates 2604 outside the holes. Then, the float foam together with the unidirectional heat conductors are sandwiched between the solar energy collector plate and the energy dispersing plate. The fastening means is caused to penetrate holes in the solar energy collector plate, the float foam and the energy disperse plate and fasten them together.

In the assembly, the conductor tubes are displaced into the holes 210301. Then, the upper conductors and the lower conductors of the uni-directional heat conductors are placed into the conductor tubes with the upper plates 2601 on the same face of the float foam; with the upper plates 2601 and the lower plates 2604 outside the conductor tubes. Then, the float foam together with the uni-directional heat conductors will be sandwiched between the solar energy collector plate and the energy dispersing plate. The fastening means penetrates the solar energy collector plate the float foam and the energy disperse plate and fastens them together, to form the unit. The bottom of the lower plate 2604 and the top of the upper plate 2601 of each type of the second variation of the one directional heat conductor will respectively contact the energy dispersing plate, and the solar energy collector plate. This heater unit can have any plan shape, although a rectangular shape is shown in the Figures.

Referring to FIGS. 29 and 30, which illustrate the functioning of the first type of the uni-directional heat conductor, when the heat 29 reaches the upper plate 210201, it will be conducted to the upper conductor 210203. Due to the properties of its bimetal when being heated, the upper conductor will bend and touch the lower conductor 210204. Heat will then be conducted to the lower conductor 210204; to the lower plate 210206 then into the surroundings of the lower plate. When there is no heat on the upper plate, the upper conductor is not heated up, the upper conductor will return to its original position, and the gap 3001 between 210203 and 210204 will exist. When there is heat 3002, flowing to the lower plate, such heat will be conducted into the lower conductor 210204. Due to the existence of the gap 3001, the heat cannot be efficiently conducted to the upper plate. Therefore, the overall performances of the uni-directional heat conductor will show that heat can only be conducted toward and into pool water but not the reverse direction, out of water.

Referring to FIGS. 31 and 32 which illustrate the function of the second type of the uni-directional heat conductor when the heat 31 reaches the upper plate 2601 it will be conducted to the upper conductor 2602. Then, the sealed up air inside the upper conductor will expand. The expanding air will expand the bellows wall and the length of the upper conductor will increase. When the lower end wall of the expanding upper conductor reaches and touches the lower conductor 2603, heat will be conducted to the lower conductor; to the lower plate 2604 and then into the surroundings of the lower plate, i.e. into pool water. When there is no heat on the upper plate 2601, the upper conductor will retract to its original up-position, and the gap 3201 will exist. When there is heat 3202 from pool water flowing onto the lower plate 2604, such heat will be conducted into the lower conductor 2603. Due to the existence of the gap 3201, such heat cannot be efficiently conducted to the upper plate. Therefore, the overall performances of the one directional heat conductor will show that heat can only be conducted downwardly toward pool water, but not in the reverse direction, i.e. upwardly away from pool water.

Referring to FIGS. 33, 34, 35 and 36, the sixth, the seventh and the eighth variations of the invented floating solar pool hater units all have a solar energy collector upper plate, 3401, 3501, 3601, respectively, many one directional heat conductors, a float foam, 3403, 3503, 3603, respectively, many fastening means 3301 for the sixth variation, (others not shown for the seventh and eighth variations) and one or many energy disperse plate(s), 3404, 3504, 3604, respectively. The seventh and the eighth variations have energy dispersing chains, 3505 and 3605, respectively. The seventh and the eighth variations have (optimal) chains spacing guides, not shown, which are the same as those described previously for the second, the third and the fourth variations of heater units. The solar energy collector plates, the one directional heat conductors, the float foams, the fastening means and the energy disperse chains are the same as those described previously for the other variations. The energy dispersing plates 3404 and 3504 are U-shaped or L-shaped thin metal plates with holes for the fastening means. FIGS. 34, 35 and 36 show the U-shaped energy disperse plates only. The energy disperse plate 3604 is a flat thin metal plate with punched-out hooks, 360401, for hooking to energy dispersing chains. The energy dispersing plate 3504 has bent metal strips 350401, for hooking to the energy dispersing chains. The construction of the sixth, the seventh and the eighth variations are the same as those for the other variations described previously.

All of the eight variations of the invented floating solar pool heater unit can be used individually or can be used jointly to form a row or an area of units. One way to join the units together is to connect the adjacent units with connecting membranes, the same as those described for the first variation. The connecting membrane can be replaced with connecting ropes as an alternate. When the joined units are not used, they can be removed from the pool and stacked together with their top sides, the solar energy collector plate sides, facing each other and their bottom sides, the bottom frame sides, facing each other, in the same way as that described for the first variation, for storage. The (optimal) chain spacing guides will keep the energy dispersing chains from tangling themselves together. When the joined units of the fifth, the sixth, the seventh, or the eighth variations are used, they can also serve as effective pool heat covers because their uni-directional heat conductors tend to keep heat into the pool water.

The foregoing is considered as illustrative only of the principles of the invention. Furthermore, since numerous modifications and changes will readily occur to those skilled in the art, it is not desired to limit the invention to the exact construction and operation shown and described, and accordingly all suitable modifications and equivalents, may be resorted to, falling within the scope of the invention as claimed.

I claim:

1. A solar heater in combination with a water pool, comprising:

a) a float having an upper side and a lower side, b) a solar heat collecting first plate spaced above said upper side of the float, c) heat radiating means spaced below the lower side of the float, to contact pool water, and d) heat transfer means extending through the float and between said heat collecting plate and said heat radiating means, for transferring heat by conduction from the plate to said means, to enable collected solar heat transfer to the pool water, e) said heat transfer means comprising a plurality of metallic elements, which are spaced apart, said float having plastic float material and a plurality of separate and individual openings through the plastic float material below said plate and passing said metallic elements, f) and wherein said metallic elements hang from said plate and extend downwardly through and spaced from a sidewall of said openings and substantially below the float lower side to be suspended by the float for contact with pool water at a depth therein below the float, g) said float suspended by water in the pool, whereby said metallic elements are floatingly suspended in and by said water pool.

2. The combination of claim 1, wherein said metallic elements comprise multiple chains hanging in and below said through openings in said plastic float material.

3. The combination of claim 1 wherein said metallic elements which extend generally vertically downwardly and are horizontally spaced apart.

4. The combination of claim 2 including hook-like parts at the undersides of the plate and supporting the chains.

* * * * *